United States Patent
Aruga et al.

(10) Patent No.: US 11,479,056 B2
(45) Date of Patent: Oct. 25, 2022

(54) INK JET RECORDING APPARATUS, INK JET RECORDING METHOD, AND INK COMPOSITION

(71) Applicant: Seiko Epson Corporation, Tokyo (JP)

(72) Inventors: Tomohiro Aruga, Matsumoto (JP); Jun Ito, Shimosuwa (JP); Kiyomi Kumamoto, Shiojiri (JP); Tomoki Maruyama, Matsumoto (JP); Yusuke Mizutaki, Shiojiri (JP)

(73) Assignee: SEIKO EPSON CORPORATION

( * ) Notice: Subject to any disclaimer, the term of this patent is extended or adjusted under 35 U.S.C. 154(b) by 116 days.

(21) Appl. No.: 17/035,988

(22) Filed: Sep. 29, 2020

(65) Prior Publication Data

US 2021/0094333 A1    Apr. 1, 2021

(30) Foreign Application Priority Data

Sep. 30, 2019   (JP) .............................. JP2019-179755

(51) Int. Cl.
| | |
|---|---|
| *B41M 5/00* | (2006.01) |
| *C09D 11/102* | (2014.01) |
| *B41J 2/175* | (2006.01) |
| *C09D 11/328* | (2014.01) |
| *C09D 11/38* | (2014.01) |

(52) U.S. Cl.
CPC ........ *B41M 5/0023* (2013.01); *B41J 2/17523* (2013.01); *C09D 11/102* (2013.01); *C09D 11/328* (2013.01); *C09D 11/38* (2013.01)

(58) Field of Classification Search
CPC ................ B41J 2/17513; B41J 2/17503; B41J 2/17553; B41J 2/17506; B41J 2002/17573
See application file for complete search history.

(56) References Cited

U.S. PATENT DOCUMENTS

| | | | |
|---|---|---|---|
| 5,619,239 A | 4/1997 | Kotaki et al. | |
| 5,745,137 A * | 4/1998 | Scheffelin | B41J 2/17509 347/85 |
| 5,746,818 A | 5/1998 | Yatake | |
| 6,070,974 A | 6/2000 | Kotaki et al. | |
| 6,145,975 A | 11/2000 | Kotaki et al. | |
| 6,164,772 A | 12/2000 | Koitabashi et al. | |
| 6,243,116 B1 | 6/2001 | Kotaki et al. | |
| 6,505,923 B1 | 1/2003 | Yamamoto et al. | |

(Continued)

FOREIGN PATENT DOCUMENTS

| | | |
|---|---|---|
| CN | 1107103 A | 8/1995 |
| CN | 102205727 A | 10/2011 |

(Continued)

*Primary Examiner* — John Zimmermann
(74) *Attorney, Agent, or Firm* — Harness, Dickey & Pierce, P.L.C.

(57) ABSTRACT

An ink jet recording apparatus includes an ink composition, an ink encasement in which the ink composition is encased, a recording head that ejects the ink composition, and a carriage configured to move the recording head back and forth. The carriage carries the ink encasement, with the ink encasement integrated with the carriage. The ink encasement has an ink fill port that opens and shuts as a port through which the ink composition is loaded and also has a detector that detects the amount of ink composition encased. The ink composition contains a surfactant with an HLB of 6 or less.

10 Claims, 3 Drawing Sheets

(56) References Cited

U.S. PATENT DOCUMENTS

| | | | |
|---|---|---|---|
| 6,767,075 B1 * | 7/2004 | Takada | B41J 2/17566 347/19 |
| 6,969,161 B2 * | 11/2005 | Kuwabara | B41J 2/17509 347/85 |
| 9,067,417 B2 | 6/2015 | Komatsu et al. | |
| 2002/0140750 A1 * | 10/2002 | Yoshiyama | B41J 2/17566 347/7 |
| 2003/0083396 A1 | 5/2003 | Ylitalo et al. | |
| 2005/0012798 A1 | 1/2005 | Adachi et al. | |
| 2006/0203055 A1 | 9/2006 | Doi | |
| 2007/0146454 A1 | 6/2007 | Doi et al. | |
| 2007/0188571 A1 | 8/2007 | Tokita et al. | |
| 2007/0263054 A1 | 11/2007 | Yatake et al. | |
| 2010/0068389 A1 | 3/2010 | Ohzeki et al. | |
| 2010/0302326 A1 * | 12/2010 | Morohoshi | B41J 2/1606 347/105 |
| 2011/0228629 A1 | 9/2011 | Kawate | |
| 2011/0242206 A1 | 10/2011 | Komatsu et al. | |
| 2012/0249667 A1 | 10/2012 | Hirata et al. | |
| 2012/0293590 A1 | 11/2012 | Yoshida et al. | |
| 2013/0044168 A1 | 2/2013 | Kaga et al. | |
| 2013/0114084 A1 * | 5/2013 | Kamiyanagi | B41J 2/17566 356/436 |
| 2013/0155160 A1 | 6/2013 | Shiono | |
| 2013/0182057 A1 * | 7/2013 | Koase | B41J 11/0022 347/102 |
| 2014/0036010 A1 | 2/2014 | Hasegawa et al. | |
| 2014/0084578 A1 | 3/2014 | Yagi et al. | |
| 2014/0125743 A1 | 5/2014 | Aruga | |
| 2014/0240391 A1 * | 8/2014 | Goto | C09D 11/38 524/220 |
| 2015/0085034 A1 | 3/2015 | Aruga et al. | |
| 2016/0040022 A1 | 2/2016 | Aruga et al. | |
| 2016/0177116 A1 | 6/2016 | Katsuragi et al. | |
| 2016/0333211 A1 | 11/2016 | Miyajima | |
| 2018/0187034 A1 * | 7/2018 | Takeno | C09D 11/037 |
| 2018/0215160 A1 * | 8/2018 | Koike | B41J 2/17566 |
| 2019/0023926 A1 | 1/2019 | Kumamoto et al. | |
| 2019/0105903 A1 | 4/2019 | Kimura et al. | |
| 2020/0207136 A1 | 7/2020 | Miyasa et al. | |
| 2020/0361220 A1 * | 11/2020 | Kumagai | B41J 2/17509 |

FOREIGN PATENT DOCUMENTS

| | | |
|---|---|---|
| CN | 102794992 A | 11/2012 |
| CN | 103173059 A | 6/2013 |
| CN | 103804992 A | 5/2014 |
| CN | 104245860 A | 12/2014 |
| JP | 2019-019220 A | 2/2019 |
| JP | 2019-069550 A | 5/2019 |

* cited by examiner

FIG. 3A
FIG. 3B
FIG. 3C
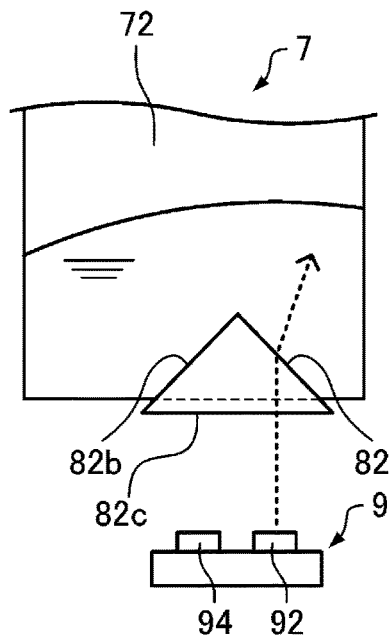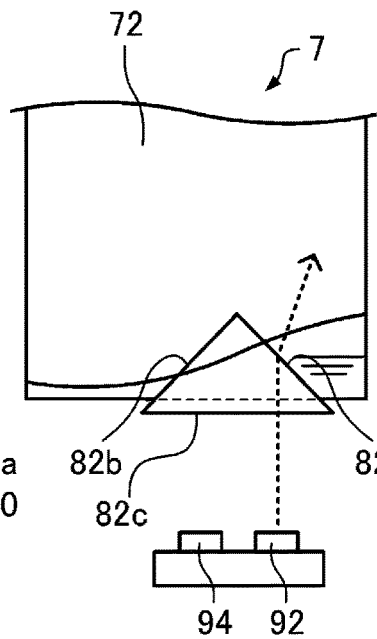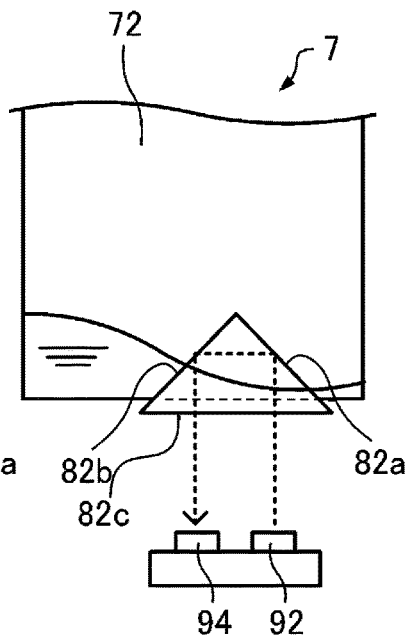
FIG. 4
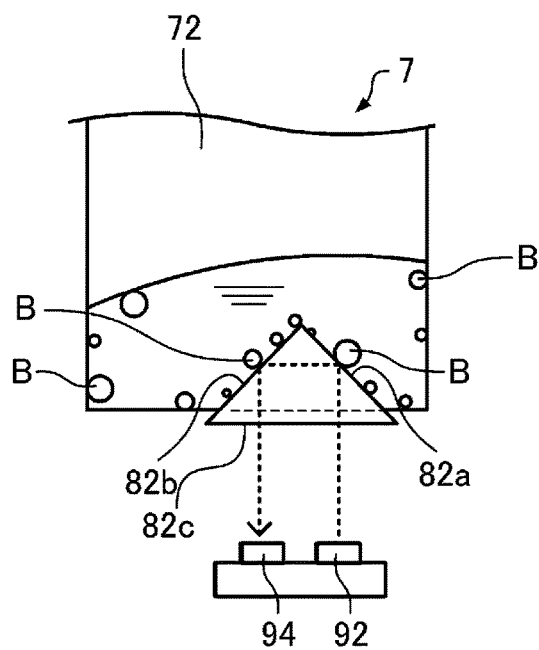

INK JET RECORDING APPARATUS, INK JET RECORDING METHOD, AND INK COMPOSITION

The present application is based on, and claims priority from JP Application Serial Number 2019-179755, filed Sep. 30, 2019, the disclosure of which is hereby incorporated by reference herein in its entirety.

BACKGROUND

1. Technical Field

The present disclosure relates to an ink jet recording apparatus, an ink jet recording method, and an ink composition.

2. Related Art

In the field of relatively small ink jet recording apparatuses, such as those for household and office use, there is a demand for increasing the capacity of an ink encasement from which ink is supplied to a recording head and for reducing the overall body size.

Known serial ink jet recording apparatuses use a cartridge, which is of small capacity, or an ink tank, which provides a larger capacity, as a container from which an ink composition is supplied to a recording head. A cartridge is a container that is mounted on a carriage (mechanism that moves a recording head back and forth) together with a recording head, and the user can detach the cartridge from the carriage and attach it again. Cartridges, however, require frequent replacement because of their small capacity. Refilling them with an ink composition also involves careful manipulation.

An ink tank, which is of larger capacity, admittedly helps reduce the frequency of replacement and refilling, but is difficult to mount on a carriage when its capacity is too large. When having a large capacity, therefore, the ink tank may supply the ink composition therein to a recording head through a tube or similar pathway instead of being mounted on a carriage. The ink tank therefore is placed somewhere except on the carriage, causing disadvantages such as a large footprint and overall body volume of the ink jet recording apparatus.

An ink encasement larger than known cartridges and smaller than known ink tanks, for example that used in the liquid ejecting apparatus described in JP-A-2019-069550, can be mounted on a carriage together with a recording head. The amount of ink composition encased in the ink encasement is not too small, and the influence on the size of the apparatus is less significant. By virtue of the moderate size of the ink encasement on the carriage, furthermore, it is easier for the user to refill the encasement with the ink composition. Since the user does not need to detach the ink encasement and attach it again for refilling, the ink encasement can be made without, for example, a structure or mechanism for detachment and attachment.

Replenishing or filling such an ink encasement mounted on a carriage with an ink composition, however, can cause bubbles to form inside the ink encasement. The ink composition in the ink encasement can also foam when it is rocked as the carriage moves. When the ink encasement has a level sensor that notifies the user of the need for replenishment, therefore, the bubbles can trigger a false detection by the sensor.

SUMMARY

A form of an ink jet recording apparatus according to an aspect of the present disclosure includes an ink composition, an ink encasement in which the ink composition is encased, a recording head that ejects the ink composition, and a carriage configured to move the recording head back and forth. The carriage carries the ink encasement, with the ink encasement integrated with the carriage. The ink encasement has an ink fill port that opens and shuts as a port through which the ink composition is loaded and also has a detector that detects an amount of the ink composition encased. The ink composition contains a surfactant with an HLB of 6 or less.

In the above form of an ink jet recording apparatus, the surfactant with an HLB of 6 or less contained in the ink composition may be an acetylene glycol surfactant.

In any of the above forms of ink jet recording apparatuses, the detector may provide optical detection of the amount of the ink composition encased.

In the above form of an ink jet recording apparatus, the detector may include a prism, and at least part of a surface of the prism may be water-repellent.

In the above form of an ink jet recording apparatus, the prism may have a siloxane compound on at least part of the surface thereof.

In any of the above forms of ink jet recording apparatuses, the ink composition may further contain a polyoxyalkylene alkyl ether surfactant.

In the above form of an ink jet recording apparatus, a ratio of an amount of the polyoxyalkylene alkyl ether surfactant to an amount of the surfactant with an HLB of 6 or less in the ink composition may be 1.0 or more and 6.0 or less.

In any of the above forms of ink jet recording apparatuses, the ink composition may further contain an amphoteric surfactant.

A form of an ink jet recording method according to an aspect of the present disclosure is a recording method in which an ink jet recording apparatus is used that includes an ink composition, an ink encasement in which the ink composition is encased, a recording head that ejects the ink composition, and a carriage configured to move the recording head back and forth. The carriage carries the ink encasement, with the ink encasement integrated with the carriage. The ink encasement has an ink fill port that opens and shuts as a port through which the ink composition is loaded and also has a detector that detects an amount of the ink composition encased. The ink composition contains a surfactant with an HLB of 6 or less. The method includes ejecting the ink composition from the recording head to attach the ink composition to a recording medium.

A form of an ink composition according to an aspect of the present disclosure contains a surfactant with an HLB of 6 or less. The ink composition is for use with an ink jet recording apparatus that includes the ink composition, an ink encasement in which the ink composition is encased, a recording head that ejects the ink composition, and a carriage configured to move the recording head back and forth. The carriage carries the ink encasement, with the ink encasement integrated with the carriage. The ink encasement has an ink fill port that opens and shuts as a port through which the ink composition is loaded and also has a detector that detects an amount of the ink composition encased.

BRIEF DESCRIPTION OF THE DRAWINGS

FIG. 3A is a schematic projection in the Y direction of the vicinity of the bottom of an ink encasement.

FIG. 3B is a schematic projection in the Y direction of the vicinity of the bottom of an ink encasement.

FIG. 3C is a schematic projection in the Y direction of the vicinity of the bottom of an ink encasement.

FIG. 4 is a schematic projection in the Y direction of the vicinity of the bottom of an ink encasement.

DESCRIPTION OF EXEMPLARY EMBODIMENTS

Figure 1:
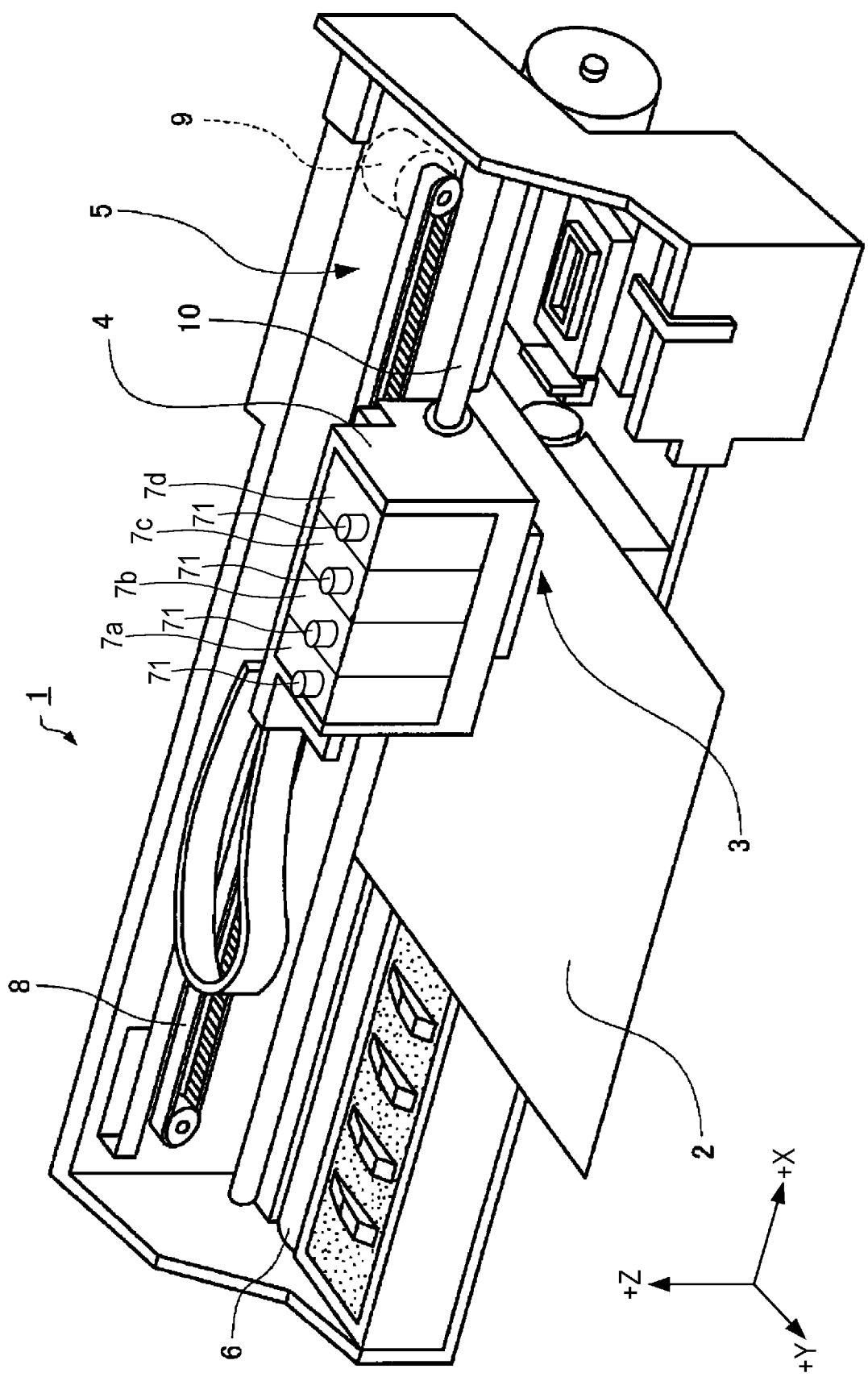
FIG. 1 is an outline perspective diagram illustrating an example of an ink jet recording apparatus according to an embodiment.

The following describes embodiments of the present disclosure. The following embodiments are descriptions of examples of the disclosure. The disclosure is never limited to these embodiments and includes variations implemented within the gist of the disclosure. Not all the configurations described below are essential for the disclosure.

1. Ink Jet Recording Apparatus

An ink jet recording apparatus according to this embodiment includes an ink composition, an ink encasement in which the ink composition is encased, a recording head that ejects the ink composition, and a carriage configured to move the recording head back and forth.

1.1. Ink Composition

As a component of the ink jet recording apparatus according to this embodiment, the ink composition contains a surfactant with an HLB of 6 or less.

1.1.1. Surfactant with an HLB of 6 or Less

The HLB of the surfactant with an HLB of 6 or less contained in the ink composition according to this embodiment is defined as follows.

The "HLB," or "hydrophilic-lipophilic balance," is a value calculated by Griffin's method. Specifically, the HLB of a surfactant can be calculated according to equation (H) below.

$$HLB = 20 \times (\% \text{ by mass of hydrophilic groups}) \qquad (H)$$

The HLB is a qualitative measure of the balance between hydrophilic and lipophilic groups in the molecule of the surfactant. A high HLB indicates that the surfactant is highly hydrophilic, whereas a low HLB indicates that the surfactant is highly lipophilic.

The surfactant with an HLB of 6 or less can be an acetylene glycol surfactant, polyoxyalkylene alkyl ether surfactant, fluorosurfactant, or silicone surfactant. A combination of surfactants of such types can also be used.

Examples of commercially available surfactants with an HLB of 6 or less include Surfynol SE (HLB=6), Surfynol (HLB=6), Surfynol 104 (HLB=4), Surfynol 420 (HLB=4), Surfynol 82 (HLB=4), Surfynol DF110D (HLB=3), Surfynol 104S (HLB=4), Surfynol 104PG50 (HLB=4), Surfynol 420 (HLB=4), Surfynol 82 (HLB=4), and Surfynol MD-20 (HLB=4) (trade names, acetylene glycol surfactants, Nissin Chemical Industry Co., Ltd.), NOIGEN DH-0300 (HLB=4) (trade name, DKS), KF-945 (HLB=4), KF-6020 (HLB=4), X-22-6191 (HLB=2), X-22-4515 (HLB=5), KF-6015 (HLB=5), KF-6017 (HLB=5), and KF-6038 (HLB=3) (trade names, silicone surfactants, Shin-Etsu Silicone), and FZ-2116 (HLB=5) and FZ-2120 (HLB=6) (trade names, silicone surfactants, Dow Corning Toray).

The surfactant with an HLB of 6 or less helps improve the antifoam properties of the ink composition. It makes the ink composition less likely to bubble, for example when the user pours the ink composition into the ink encasement or when the ink encasement is shaken on a moving carriage. Even when the ink composition foams, furthermore, the foam quickly disappears.

The surfactant with an HLB of 6 or less also helps improve the wettability of the ink composition on the inner walls of the ink encasement including the surface of a level detector (described later herein), thereby helping prevent bubbles from adhering to the inner walls. The surfactant, moreover, makes the ink composition less likely to foam, for example when the user pours the ink composition into the ink encasement or when the ink encasement is shaken on a moving carriage. Even when the ink composition foams, furthermore, the foam easily disappears. Through these effects, the surfactant helps reduce false detections of the ink composition level (described later herein).

Preferably, the surfactant with an HLB of 6 or less is an acetylene glycol surfactant. Examples include Surfynol surfactants such as listed above.

Preferably, the amount of the surfactant with an HLB of 6 or less is 0.01% by mass or more and 2.0% by mass or less, more preferably 0.05% by mass or more and 1.50% by mass or less, even more preferably 0.10% by mass or more and 1.00% by mass or less of the total mass of the ink composition. A percentage of 0.01% by mass or more ensures that the surfactant with an HLB of 6 or less produces its defoaming effects and also helps improve ejection stability. The defoaming effects of 0.01% by mass or more surfactant with an HLB of 6 or less also helps reduce false detections of the ink composition level (described later herein). The use of 2.0% by mass or less surfactant with an HLB of 6 or less, moreover, helps ensure stable ejection.

Preferably, the HLB of the surfactant with an HLB of 6 or less is 5 or less, more preferably 3 or more. An HLB of 5 or less helps further improve ejection stability. An HLB of 3 or more helps further improve the ejection stability and antifoam properties of the ink composition.

1.1.2. Extra Ingredients

The ink composition may contain (1) a polyoxyalkylene alkyl ether surfactant with an HLB of more than 6, (2) an amphoteric surfactant, (3) a colorant, (4) water, (5) an organic solvent, and (6) other ingredients. (1) Polyoxyalkylene Alkyl Ether Surfactant with an HLB of More Than 6

Commercially available polyoxyalkylene alkyl ether surfactants with an HLB of more than 6 that can be used include NOIGEN ET-116B (HLB=12), NOIGEN DL-0415 (HLB=15), NOIGEN ET-106A (HLB=10.9), NOIGEN DH-0300 (HLB=4), NOIGEN YX-400 (HLB=18), and NOIGEN EA-160 (HLB=15.4) (trade names, polyoxyalkylene alkyl ether surfactants, DKS), Newcol 1006 (trade name, a polyoxyalkylene alkyl ether surfactant, Nippon Nyukazai Co., Ltd.), and EMULGEN 1108 (HLB=13.4) (trade name, a polyoxyalkylene alkyl ether, Kao Corporation).

A polyoxyalkylene alkyl ether surfactant with an HLB of more than 6 helps further improve the wettability of the ink composition on the inner walls of the ink encasement including the surface of the level detector, thereby providing more effective prevention of the adhesion of bubbles to the inner walls. Such a surfactant therefore helps further reduce false detections of the ink composition level (described later herein).

One polyoxyalkylene alkyl ether surfactant with an HLB of more than 6 may be used alone, or two or more may be used in combination.

The HLB of the polyoxyalkylene alkyl ether surfactant with an HLB of more than 6, when used, is preferably 11 or more and 16 or less, more preferably 12 or more and 15 or less. The use of a polyoxyalkylene alkyl ether with such an HLB tends to make the ink composition better in initial loading and stability in continuous printing. In particular, an HLB of 12 or more tends to lead to superb initial loading and stability in continuous printing.

When a polyoxyalkylene alkyl ether is used as a surfactant with an HLB of more than 6, it is preferred that the ratio of the amount of the polyoxyalkylene alkyl ether surfactant to that of the surfactant with an HLB of 6 or less in the ink composition be 1.0 or more and 6.0 or less, more preferably 2.0 or more and 5.0 or less, by mass. The use of such an amount of polyoxyalkylene alkyl ether with an HLB of more than 6 helps reduce false detections of the ink level more effectively without compromising ejection stability.

The amount of the surfactant with an HLB of more than 6, when used, is preferably 0.1% by mass or more and 5.0% by mass or less, more preferably 0.5% by mass or more and 3.0% by mass or less, even more preferably 1.0% by mass or more and 2.0% by mass or less of the total mass of the ink composition. A surfactant with an HLB of more than 6 gives the ink composition good wettability on the inner walls of the ink encasement including the surface of the level detector and thereby contributes to reducing false detections of the ink level when its percentage is 0.1% by mass or more. A surfactant with an HLB of more than 6, furthermore, provides effective prevention of foaming and thereby helps ensure stable ejection when its percentage is 5.0% by mass or less.

(2) Amphoteric Surfactant

The ink composition may further contain an amphoteric surfactant. Examples of amphoteric surfactants include alkylpyridinium salts, alkyl amino acid salts, and alkyl dimethyl betaines. An amphoteric surfactant in the ink composition can make the effects of the surfactant with an HLB of 6 or less more significant. The presence of an amphoteric surfactant in the ink composition, furthermore, helps produce recordings with higher moisture resistance.

An amphoteric surfactant can be, for example, a betaine surfactant represented by formula (b-1) below.

(In formula (b-1), R represents a hydrogen atom or alkyl, aryl, or heterocyclic group. L represents a linking group with a valency of 2 or more. M represents a hydrogen atom, an alkali metal atom, an ammonium group, a protonated organic amine or nitrogen-containing heterocyclic group, or a quaternary ammonium ion group. When being a counterion for an ammonium ion that involves the N atom in formula (b-1), M represents a non-cationic group. q represents an integer of 1 or more, and r represents an integer of 1 or more and 4 or less. p represents an integer of 0 or more and 4 or less, and p+r is 3 or 4. When p+r is 4, the nitrogen atom N is a component of a quaternary amine. When p is 2 or more, the Rs may be the same or different. When q is 2 or more, the COOMs may be the same or different. When r is 2 or more, the L-(COOM)$_q$s may be the same or different.)

Preferably, the betaine surfactant represented by formula (b-1) above is a compound represented by formula (b-2).

(In formula (b-2), $R^1$ to $R^3$ each independently represent a C1 to C20 alkyl group, and X represents a divalent linking group.)

Preferably, the compound represented by formula (b-2) above is the compound represented by formula (b-3) below (myristyl betaine or tetradecyl-N,N-dimethylglycine).

The amount of the amphoteric surfactant, when used, is preferably 0.1% by mass or more and 4.0% by mass or less, more preferably 0.5% by mass or more and 3.0% by mass or less, even more preferably 1.0% by mass or more and 3.0% by mass or less of the total mass of the ink composition. An amphoteric surfactant can improve the effects of the surfactant with an HLB of 6 or less when its percentage is 0.1% by mass or more, but approximately more than 4.0% by mass amphoteric surfactant can cause the ink composition to foam easily. When an amphoteric surfactant is used, the use of a surfactant with an HLB of 3 or less as the surfactant with an HLB of 6 or less leads to effective prevention of foaming.

(3) Colorant

The ink composition may further contain a colorant. Colorants make the ink composition colored. A colored ink composition is used to color a recording medium. Pigment(s), dye(s), or both can be used.

Pigments

The use of a pigment as a colorant helps improve the light fastness of the ink composition. Both inorganic and organic pigments can be used. Examples include process color pigments, such as cyan, yellow, magenta, and black pigments, and spot color pigments, such as white and glitter pigments.

Examples of organic pigments include quinacridone pigments, quinacridone quinone pigments, dioxane pigments, dioxazine pigments, phthalocyanine pigments, anthrapyrimidine pigments, anthanthrone pigments, indanthrone pigments, flavanthrone pigments, perylene pigments, diketopyrrolopyrrole pigments, perinone pigments, quinophthalone pigments, anthraquinone pigments, thioindigo pigments, benzimidazolone pigments, thioindigo pigments, isoindolinone pigments, azomethine pigments, dye chelates, dyeing lakes, nitro pigments, nitroso pigments, aniline black, and azo pigments, such as insoluble azo pigments, condensed azo pigments, azo lakes, and chelate azo pigments.

Specific examples of organic pigments include the following.

Examples of cyan pigments include C.I. Pigment Blue 1, 2, 3, 15:3, 15:4, 16, 22, and 60 and C.I. Vat Blue 4 and 60. One or a mixture of two or more selected from the group consisting of C.I. Pigment Blue 15:3, 15:4, and 60 is preferred.

Examples of magenta pigments include C.I. Pigment Red 5, 7, 12, 48 (Ca), 48 (Mn), 57 (Ca), 57:1, 112, 122, 123, 168, 184, and 202 and C.I. Pigment Violet 19. One or a mixture of two or more selected from the group consisting of C.I. Pigment Red 122, 202, and 209 and C.I. Pigment Violet 19 is preferred.

Examples of yellow pigments include C.I. Pigment Yellow 1, 2, 3, 12, 13, 14C, 16, 17, 73, 74, 75, 83, 93, 95, 97, 98, 119, 110, 114, 128, 129, 138, 150, 151, 154, 155, 180, and 185. One or a mixture of two or more selected from the group consisting of C.I. Pigment Yellow 74, 109, 110, 128, and 138 is preferred.

An orange pigment can be C.I. Pigment Orange 36 or 43. A mixture of them can also be used.

A green pigments can be C.I. Pigment Green 7 or 36. A mixture of them can also be used.

Examples of black pigments include furnace black, lamp black, acetylene black, and channel black (C.I. Pigment Black 7 pigments). Examples of commercially available ones include No. 2300, 900, MCF88, No. 20B, No. 33, No. 40, No. 45, No. 52, MA7, MA8, MA100, and No. 2200B (trade names, Mitsubishi Chemical Corporation), Color Black FW1, FW2, FW2V, FW18, FW200, 5150, 5160, and 5170, Printex 35, U, V, and 140U, and Special Black 6, 5, 4A, 4, and 250 (trade names, Degussa), Conductex SC and Raven 1255, 5750, 5250, 5000, 3500, 1255, and 700 (all are trade names, Columbian Carbon), and REGAL 400R, 330R, and 660R, MOGUL L, MONARCH 700, 800, 880, 900, 1000, 1100, 1300, and 1400, and ELFTEX 12 (trade names, Cabot). One or a mixture of two or more of such carbon black pigments may be used.

A glitter pigment can be any kind of pigment that can glitter on a medium. Examples include metal particles, which are particles of one, or an alloy of two or more, selected from the group consisting of aluminum, silver, gold, platinum, nickel, chromium, tin, zinc, indium, titanium, and copper (alloys also referred to as metallic pigments), and pearl pigments, which have a pearly gloss. Typical examples of pearl pigments include pigments having a pearlescent or interference gloss, such as titanium dioxide-coated mica, pearl essence, and bismuth oxychloride. Glitter pigments that have been surface-treated to be inert with water can also be used.

Examples of white pigments include metal compounds, such as metal oxides, barium sulfate, and calcium carbonate. Examples of metal oxides include titanium dioxide, zinc oxide, silica, alumina, and magnesium oxide. Hollow particles can also be used as a white pigment.

One such pigment alone or a combination of two or more may be used. Organic pigments are preferred in terms of storage stability characteristics, such as light fastness, weather resistance, and resistance to gases.

Pigments that reach stable dispersion in the ink are preferred. For example, a pigment may be rendered self-dispersible through a surface treatment of the pigment particles, such as surface oxidation or sulfonation, with ozone, hypochlorous acid, fuming sulfuric acid, etc. Alternatively, a polymeric dispersant may be used.

Dyes

The ink composition may contain a dye as a colorant. The dye can be of any kind; acidic dyes, direct dyes, reactive dyes, basic dyes, and disperse dyes can be used. Examples include C.I. Acid Yellow 17, 23, 42, 44, 79, and 142, C.I. Acid Red 52, 80, 82, 249, 254, and 289, C.I. Acid Blue 9, 45, and 249, C.I. Acid Black 1, 2, 24, and 94, C.I. Food Black 1 and 2, C.I. Direct Yellow 1, 12, 24, 33, 50, 55, 58, 86, 132, 142, 144, and 173, C.I. Direct Red 1, 4, 9, 80, 81, 132, 225, and 227, C.I. Direct Blue 1, 2, 15, 71, 86, 87, 98, 165, 199, and 202, C.I. Direct Black 19, 38, 51, 71, 154, 168, 171, and 195, C.I. Reactive Red 14, 32, 55, 79, 141, and 249, and C.I. Reactive Black 3, 4, and 35.

Other examples include at least one selected from the compound represented by formula (y-1) below or its salt

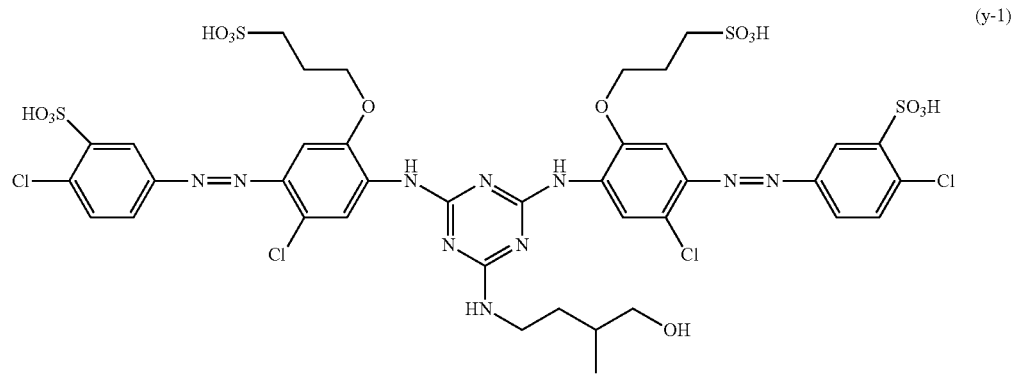 [SMILES: CC(CO)CCNc1nc(Nc2cc(Cl)c(N=Nc3ccc(Cl)c(S(=O)(=O)O)c3)cc2OCCCS(=O)(=O)O)nc(Nc2cc(Cl)c(N=Nc3ccc(Cl)c(S(=O)(=O)O)c3)cc2OCCCS(=O)(=O)O)n1]

(y-1)

(In formula (y-1), each of the four sulfonic acid groups may independently be in the sulfonate form. Examples of counterions in a salt of the compound represented by formula (y-1) include the hydrogen (proton), lithium, sodium, potassium, and ammonium ions, and the counterion may be of the same or different species between the four sulfonic acid groups.), the compound represented by formula (y-2) below or its salt

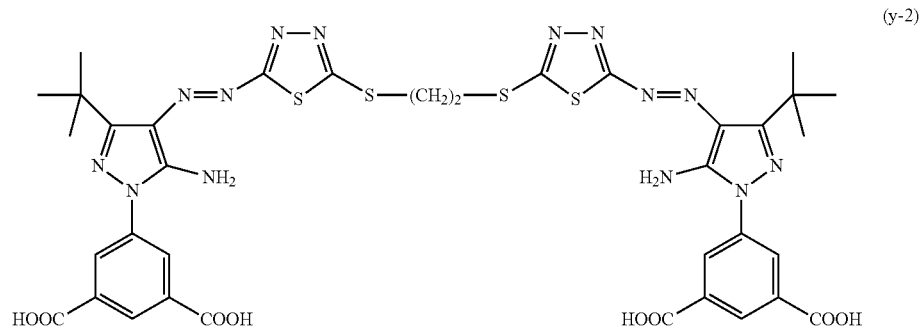

(y-2)

(In formula (y-2), each of the four carboxy groups may independently be in the carboxylate form. Examples of counterions in a salt of the compound represented by formula (y-2) include the hydrogen (proton), lithium, sodium, potassium, and ammonium ions, and the counterion may be of the same or different species between the four carboxy groups.), the compound represented by formula (y-3) below or its salt

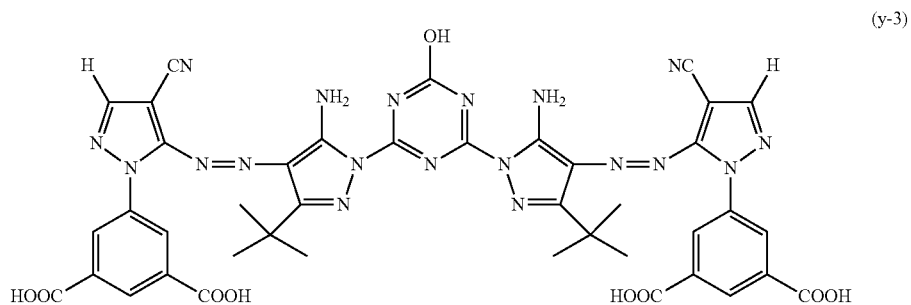 [SMILES: CC(C)(C)c1nn(-c2nc(O)nc(-n3nc(C(C)(C)C)c(N=Nc4c(C#N)cnn4-c4cc(C(=O)O)cc(C(=O)O)c4)c3N)n2)c(N)c1N=Nc1c(C#N)cnn1-c1cc(C(=O)O)cc(C(=O)O)c1]
(y-3)

(In formula (y-3), each of the four carboxy groups may independently be in the carboxylate form. Examples of counterions in a salt of the compound represented by formula (y-3) include the hydrogen (proton), lithium, sodium, potassium, and ammonium ions, and the counterion may be of the same or different species between the four carboxy groups.), the compound represented by formula (y-4) below or its salt,

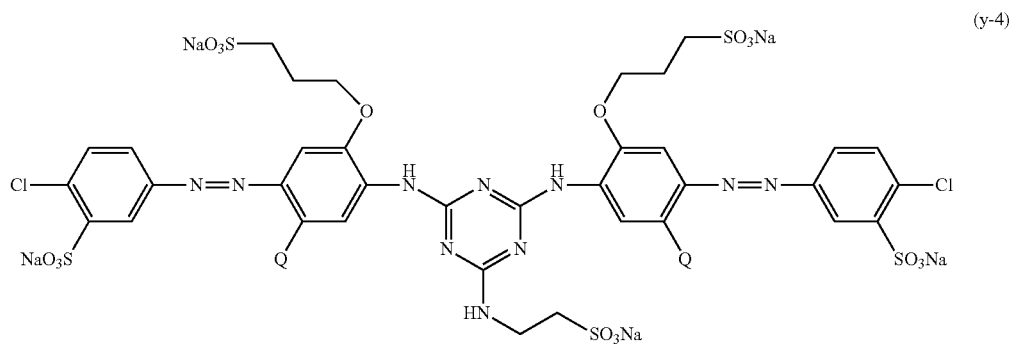
(y-4)

the compound represented by formula (y-5) below or its salt,

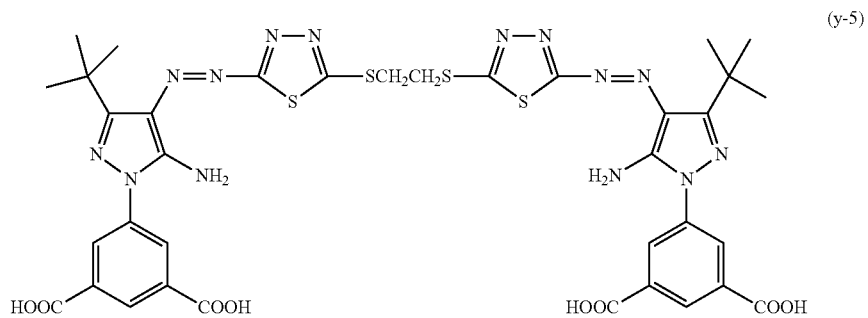
(y-5)

the compound represented by formula (m-1) below or its salt

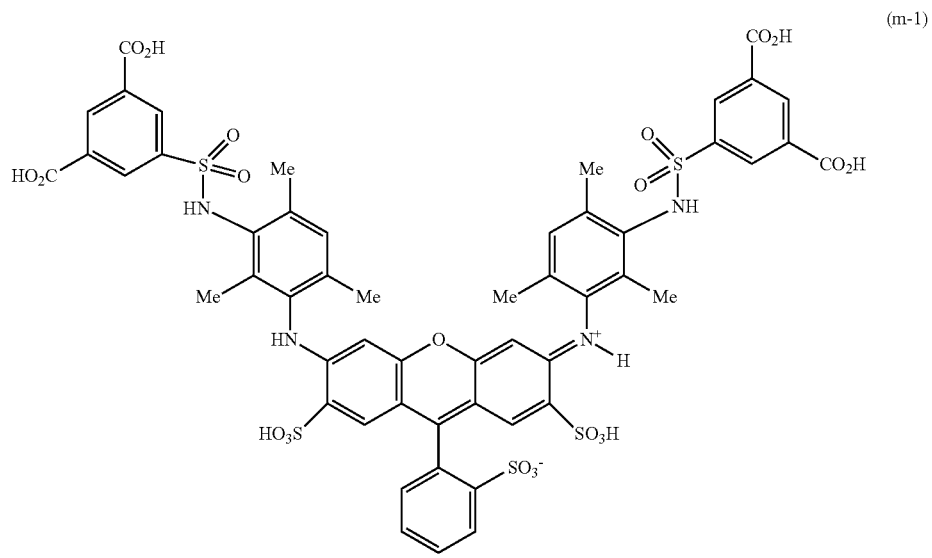

(m-1)

(Examples of counterions in a salt of the compound represented by formula (m-1) include the hydrogen (proton), lithium, sodium, potassium, and ammonium ions, and the counterion may be of the same or different species between the four carboxy and two sulfonic acid groups.), the compound represented by formula (m-2) below or its salt

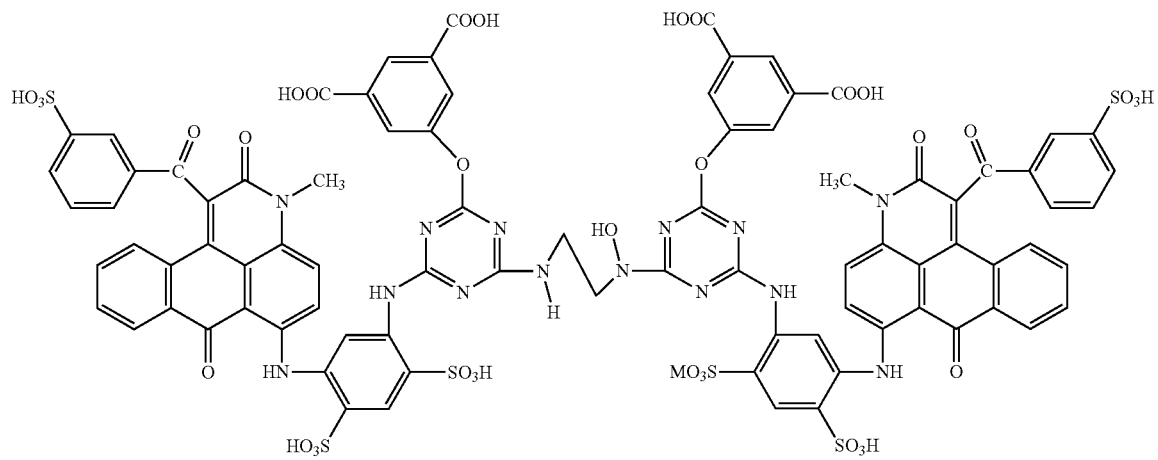

(m-2)

(Examples of counterions in a salt of the compound represented by formula (m-2) include the hydrogen (proton), lithium, sodium, potassium, and ammonium ions, and the counterion may be of the same or different species between the four carboxy and six sulfonic acid groups.), a compound represented by formula (m-3) below or its salt

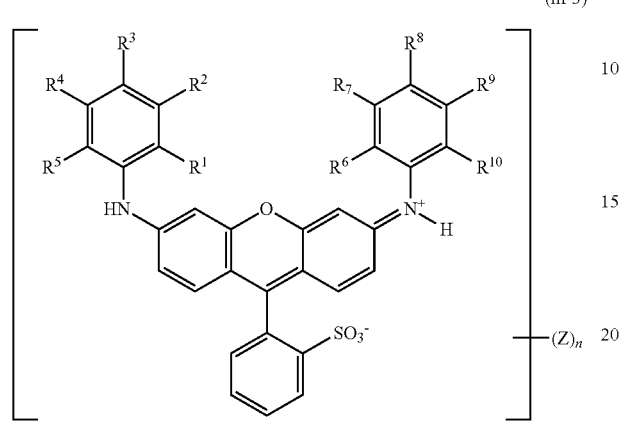

(m-3)

(In formula (m-3), $R^1$, $R^5$, $R^6$, and $R^{10}$ each independently represent an alkyl group. $R^3$ and $R^8$ each independently represent a hydrogen atom or alkyl, alkoxy, or aryloxy group. An alkyl, alkoxy, or aryloxy group may have at least one type of substituent selected from the group of substituents consisting of the alkyl, aryl, arylalkyl, hydroxyl, carbamoyl, sulfamoyl, alkoxy, and cyano groups, halogens, and ionic groups. $R^2$, $R^4$, $R^7$, and $R^9$ each independently represent a hydrogen atom or an acylamino group represented by formula (m-3') below, with at least one of $R^2$, $R^4$, $R^7$, and $R^9$ being an acylamino group represented by formula (m-3') below. Z represents a $SO_3H$, $SO_3M$ (where M represents an ammonium ion or alkali metal ion), or sulfamoyl group. n represents an integer of 0 to 3 when at least one of $R^2$, $R^3$, $R^4$, $R^7$, $R^8$, and $R^9$ is substituted with an ionic group, and an integer of 1 to 3 when not. Z, when present, is in place of at least one aromatic hydrogen atom.)

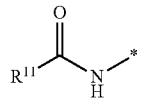

(m-3')

(In formula (m-3'), $R^{11}$ represents an alkyl, cycloalkyl, aryl, arylalkyl, alkenyl, or heterocyclic group. The alkyl, cycloalkyl, aryl, arylalkyl, alkenyl, or heterocyclic group may have at least one type of substituent selected from the group of substituents consisting of the alkyl, aryl, arylalkyl, alkenyl, alkoxy, cyano, alkylamino, sulfoalkyl, carbamoyl, sulfamoyl, and sulfonylamino groups, halogens, and ionic groups. * represents a site for binding with the aromatic ring in formula (m-3).) (Examples of counterions in a salt of a compound represented by formula (m-3) include the hydrogen (proton), lithium, sodium, potassium, and ammonium ions.), the compound represented by formula (m-4) below or its salt

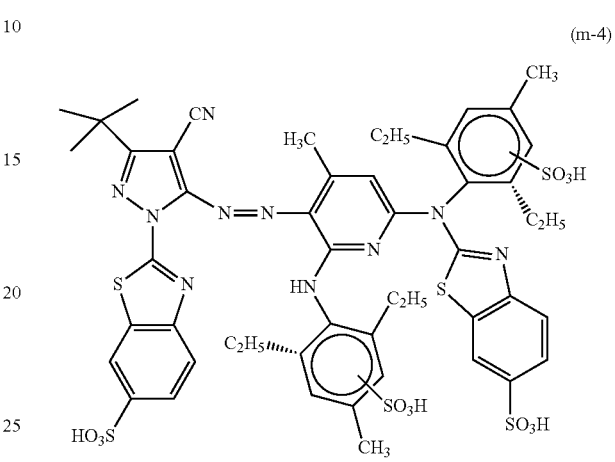

(m-4)

(Examples of counterions in a salt of the compound represented by formula (m-4) include the hydrogen (proton), lithium, sodium, potassium, and ammonium ions, and the counterion may be of the same or different species between the four sulfonic acid groups.), a compound represented by formula (m-5) below or its salt

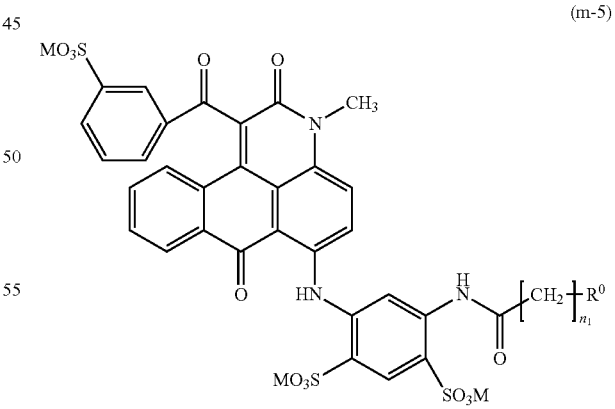

(m-5)

(In formula (m-5), $n_1$ is 1 or 2, each of the three Ms is sodium or ammonium, the three Ms may be the same or different, and $R^0$ is a C1 to C8 monoalkylamino group substituted with a carboxy group.), a compound represented by formula (c-1) below or its salt

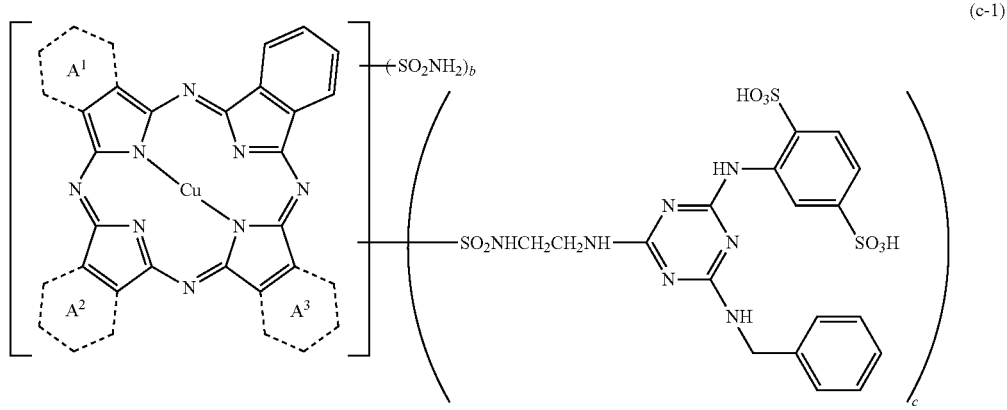

(In formula (c-1), 0≤b≤4, 0≤c≤4, and 1≤(b+c)≤4, where b+c is an integer. Rings $A^1$, $A^2$, and $A^3$ are each selected from the benzene, 2,3-pyridine, and 3,2-pyridine rings, with at least one of rings $A^1$, $A^2$, and $A^3$ being a 2,3-pyridine or 3,2-pyridine ring. Rings $A^1$, $A^2$, and $A^3$ may be the same or different.) (Examples of counterions in a salt of a compound represented by formula (c-1) include the hydrogen (proton), lithium, sodium, potassium, and ammonium ions, and the counterion may be of the same or different species between the sulfonic acid groups.), the compound represented by formula (c-2) below or its salt

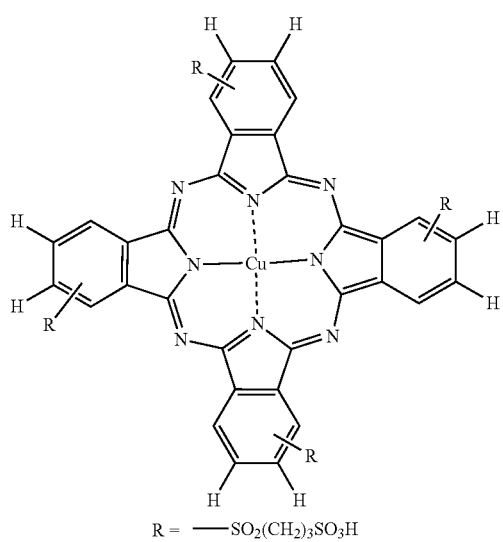

R = ——SO$_2$(CH$_2$)$_3$SO$_3$H (Examples of counterions in a salt of the compound represented by formula (c-2) include the hydrogen (proton), lithium, sodium, potassium, and ammonium ions, and the counterion may be of the same or different species between the four sulfonic groups.), the compound represented by formula (c-3) below or its salt

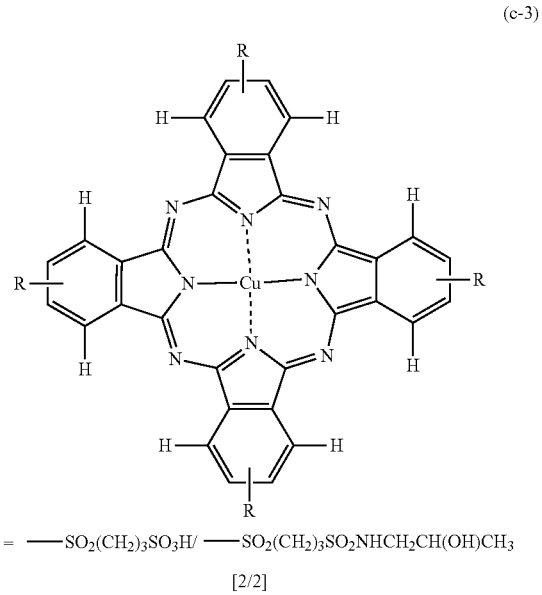

R = ——SO$_2$(CH$_2$)$_3$SO$_3$H/ ——SO$_2$(CH$_2$)$_3$SO$_2$NHCH$_2$CH(OH)CH$_3$ (Examples of counterions in a salt of the compound represented by formula (c-3) include the hydrogen (proton), lithium, sodium, potassium, and ammonium ions, and the counterion may be of the same or different species between the two sulfonic acid groups.), a compound represented by formula (c-4) below or its salt

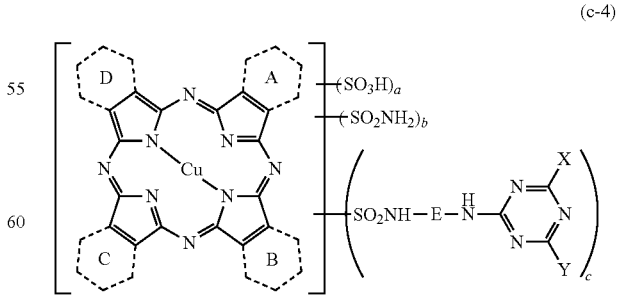

(In formula (c-4), each of rings A, B, C, and D is independently an aromatic six-membered ring, with at least one of rings A, B, C, and D being a pyridine or pyrazine ring. E is an alkylene group. X is a sulfo-, carboxy-, or phosphono-substituted anilino group that may further have one to four substituents of type(s) selected from the group consisting of the sulfonic acid, carboxy, phosphono, sulfamoyl, carbamoyl, hydroxy, alkoxy, amino, alkylamino, dialkylamino, arylamino, diarylamino, acetylamino, ureido, alkyl, nitro, and cyano groups, halogens, and alkylsulfonyl and alkylthio groups. Y is a hydroxy or amino group. $1.0 \leq a \leq 2.0$, $0.0 \leq b \leq 3.0$, $0.1 \leq c \leq 3.0$, and $1.0 \leq a+b+c \leq 4.0$.) (Examples of counterions in a salt of a compound represented by formula (c-4) include the hydrogen (proton), lithium, sodium, potassium, and ammonium ions.), the compound represented by formula (c-5) below or its salt

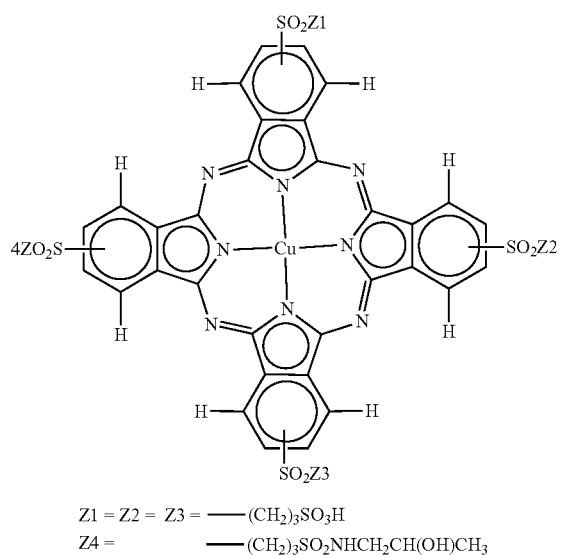

(c-5)

$Z1 = Z2 = Z3 = $ ———$(CH_2)_3SO_3H$
$Z4 = $ ———$(CH_2)_3SO_2NHCH_2CH(OH)CH_3$ (Examples of counterions in a salt of the compound represented by formula (c-5) include the hydrogen (proton), lithium, sodium, potassium, and ammonium ions, and the counterion may be of the same or different species between the three sulfonic acid groups.), and a compound represented by formula (c-6) or its salt

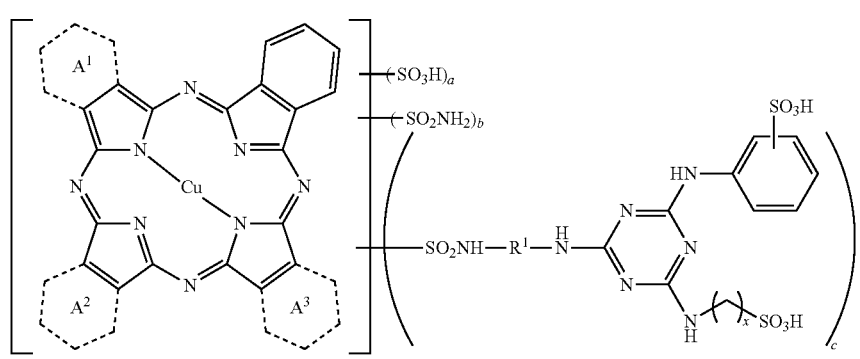

(c-6)

(In formula (c-6), rings $A^1$, $A^2$, and $A^3$ are each selected from the benzene, 2,3-pyridine, and 3,2-pyridine rings, with at least one of rings $A^1$, $A^2$, and $A^3$ being a 2,3-pyridine or 3,2-pyridine ring, and rings $A^1$, $A^2$, and $A^3$ may be the same or different. $1.0 \leq a \leq 3.0$, $0.2 \leq b \leq 1.8$, $0.8 \leq c \leq 1.6$, and $0 \leq a+b+c \leq 4$. $1 \leq x \leq 3$, where x is an integer. $R^1$ is a C1 to C6 linear alkylene group.).

One such colorant, whether a pigment or a dye, may be used alone, or two or more may be used in combination.

Preferably, the total colorant content is 1% by mass or more and 20% by mass or less of the total mass (100% by mass) of the ink composition. The ink composition may be a clear composition (clear ink), which is colorant-free or contains so small an amount of colorant that the purpose of its use is no longer coloring (e.g., 0.1% by mass or less).

(4) Water

The ink composition according to this embodiment may contain water. For example, the water can be of a type from which ionic impurities have been removed to the lowest possible levels, such as deionized water, ultrafiltered water, reverse osmosis water, distilled water, or any other type of purified or ultrapure water. The use of sterilized water, for example sterilized by ultraviolet irradiation or adding hydrogen peroxide, helps control the development of bacteria and fungi when the ink composition is stored long.

Preferably, the water content is 40% by mass or more, more preferably 45% by mass or more, even more preferably 50% by mass or more of the total amount (100% by mass) of the ink composition. A water content of 40% by mass or more makes the ink composition of relatively low viscosity. As for the upper limit, the water content is preferably 90% by mass or less, more preferably 85% by mass or less, even more preferably 80% by mass or less of the total amount of the ink composition.

(5) Organic Solvent

The ink composition may contain an organic solvent. Although optional, the use of an organic solvent is an easy way to combine quick drying and stable ejection. Water-soluble organic solvents are preferred.

A function of the organic solvent is to improve the wettability of the ink composition on a recording medium and to enhance the water retention of the ink composition. Examples of organic solvents include esters, alkylene glycol ethers, cyclic esters, nitrogen-containing solvents, and polyhydric alcohols. Examples of nitrogen-containing solvents include cyclic amides and acyclic amides. Examples of acyclic amides include alkoxyalkylamides.

Examples of esters include glycol monoacetates, such as ethylene glycol monomethyl ether acetate, ethylene glycol monoethyl ether acetate, ethylene glycol monobutyl ether acetate, diethylene glycol monomethyl ether acetate, diethylene glycol monoethyl ether acetate, diethylene glycol monobutyl ether acetate, propylene glycol monomethyl ether acetate, dipropylene glycol monomethyl ether acetate, and methoxybutyl acetate, and glycol diesters, such as ethylene glycol diacetate, diethylene glycol diacetate, propylene glycol diacetate, dipropylene glycol diacetate, ethylene glycol acetate propionate, ethylene glycol acetate butyrate, diethylene glycol acetate butyrate, diethylene glycol acetate propionate, diethylene glycol acetate butyrate, propylene glycol acetate propionate, propylene glycol acetate butyrate, dipropylene glycol acetate butyrate, and dipropylene glycol acetate propionate.

An alkylene glycol ether can be any monoether or diether of an alkylene glycol, preferably an alkyl ether. Specific examples include alkylene glycol monoalkyl ethers, such as ethylene glycol monomethyl ether, ethylene glycol monoethyl ether, ethylene glycol monoisopropyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether, tetraethylene glycol monomethyl ether, tetraethylene glycol monoethyl ether, tetraethylene glycol monobutyl ether, propylene glycol monomethyl ether, propylene glycol monoethyl ether, propylene glycol monopropyl ether, propylene glycol monobutyl ether, dipropylene glycol monomethyl ether, dipropylene glycol monoethyl ether, dipropylene glycol monopropyl ether, dipropylene glycol monobutyl ether, and tripropylene glycol monobutyl ether, and alkylene glycol dialkyl ethers, such as ethylene glycol dimethyl ether, ethylene glycol diethyl ether, ethylene glycol dibutyl ether, diethylene glycol dimethyl ether, diethylene glycol diethyl ether, diethylene glycol dibutyl ether, diethylene glycol methyl ethyl ether, diethylene glycol methyl butyl ether, triethylene glycol dimethyl ether, triethylene glycol diethyl ether, triethylene glycol dibutyl ether, triethylene glycol methyl butyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, dipropylene glycol diethyl ether, and tripropylene glycol dimethyl ether.

Examples of cyclic esters include cyclic esters (lactones) such as β-propiolactone, γ-butyrolactone, δ-valerolactone, ε-caprolactone, β-butyrolactone, β-valerolactone, γ-valerolactone, β-hexanolactone, γ-hexanolactone, δ-hexanolactone, β-heptanolactone, γ-heptanolactone, δ-heptanolactone, ε-heptanolactone, γ-octanolactone, δ-octanolactone, ε-octanolactone, δ-nonanolactone, ε-nonanolactone, and ε-decanolactone and compounds derived from such lactones by substituting hydrogen(s) in the methylene group next to the carbonyl group with a C1 to C4 alkyl group.

Examples of alkoxyalkylamides include 3-methoxy-N,N-dimethylpropionamide, 3-methoxy-N,N-diethylpropionamide, 3-methoxy-N,N-methylethylpropionamide, 3-ethoxy-N,N-dimethylpropionamide, 3-ethoxy-N,N-diethylpropionamide, 3-ethoxy-N,N-methylethylpropionamide, 3-n-butoxy-N,N-dimethylpropionamide, 3-n-butoxy-N,N-diethylpropionamide, 3-n-butoxy-N,N-methylethylpropionamide, 3-n-propoxy-N,N-dimethylpropionamide, 3-n-propoxy-N,N-diethylpropionamide, 3-n-propoxy-N,N-methylethylpropionamide, 3-isopropoxy-N,N-dimethylpropionamide, 3-isopropoxy-N,N-diethylpropionamide, 3-isopropoxy-N,N-methylethylpropionamide, 3-tert-butoxy-N,N-dimethylpropionamide, 3-tert-butoxy-N,N-diethylpropionamide, and 3-tert-butoxy-N,N-methylethylpropionamide.

Examples of cyclic amides include lactams, such as pyrrolidones including 2-pyrrolidone, 1-methyl-2-pyrrolidone, 1-ethyl-2-pyrrolidone, 1-propyl-2-pyrrolidone, and 1-butyl-2-pyrrolidone. These are preferred in that they help resin particles, described below, form film. 2-Pyrrolidone is particularly preferred.

It is also preferred to use an alkoxyalkylamide, which is a type of acyclic amide and is represented by formula (1) below.

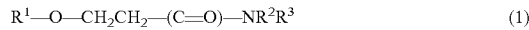
$$R^1\text{—O—}CH_2CH_2\text{—}(C\!=\!O)\text{—}NR^2R^3 \quad (1)$$

In formula (1) above, $R^1$ denotes a C1 to C4 alkyl group, and $R^2$ and $R^3$ each independently denote a methyl or ethyl group. The "C1 to C4 alkyl group" can be a linear or branched alkyl group. To name a few, it can be a methyl, ethyl, n-propyl, isopropyl, n-butyl, sec-butyl, isobutyl, or tert-butyl group. One compound represented by formula (1) above may be used alone, or two or more may be used as a mixture.

Examples of polyhydric alcohols include 1,2-alkanediols (e.g., alkanediols such as ethylene glycol, propylene glycol (also known as propane-1,2-diol), triethylene glycol, 1,2-butanediol, 1,2-pentanediol, 1,2-hexanediol, 1,2-heptanediol, and 1,2-octanediol) and polyhydric alcohols other than 1,2-alkanediols (polyols) (e.g., diethylene glycol, dipropylene glycol, 1,3-propanediol, 1,3-butanediol (also known as 1,3-butylene glycol), 1,4-butanediol, 1,5-pentanediol, 1,6-hexanediol, 2-ethyl-2-methyl-1,3-propanediol, 2-methyl-2-propyl-1,3-propanediol, 2-methyl-1,3-propanediol, 2,2-dimethyl-1,3-propanediol, 3-methyl-1,3-butanediol, 2-ethyl-1,3-hexanediol, 3-methyl-1,5-pentanediol, 2-methylpentane-2,4-diol, trimethylolpropane, and glycerol).

The ink composition may contain one such organic solvent as listed above alone or may contain two or more in combination. When the ink composition is made with organic solvent(s), the total percentage of organic solvents to the ink composition as a whole is 3.0% by mass or more and 30.0% by mass or less, preferably 5.0% by mass or more and 25.0% by mass or less, more preferably 10.0% by mass or more and 20.0% by mass or less.

(6) Other Ingredients

Other ingredients that may be contained in the ink composition include pH-adjusting agents, fungicides/preservatives, chelating agents, antirusts, antimolds, antioxidants, antireductants, and drying agents.

Examples of pH-adjusting agents include urea compounds, amines, morpholines, piperazines, and aminoalcohols, such as alkanolamines. Examples of urea compounds include urea, ethylene urea, tetramethylurea, thiourea, and 1,3-dimethyl-2-imidazolidinone. Examples of amines include diethanolamine, triethanolamine, and triisopropanolamine. pH-adjusting agents help, for example, retard or accelerate the dissolution of impurities from materials forming the channel through which the ink flows, thereby helping adjust the detergency of the ink composition.

Examples of fungicides/preservatives include PROXEL CRL, PROXEL BDN, PROXEL GXL, PROXEL XL2, PROXEL IB, and PROXEL TN (all are trade names; Lonza). Fungicides/preservatives help control fungal and bacterial growth, thereby improving the storage of the ink composition.

Examples of chelating agents include ethylenediaminetetraacetic acid (EDTA) and the nitrilotriacetate, hexametaphosphate, pyrophosphate, and metaphosphate of ethylenediamine.

1.1.3. Use of the Ink Composition

As stated, this ink composition contains a surfactant with an HLB of 6 or less. This ink composition, furthermore, is for use with an ink jet recording apparatus that includes the ink composition, an ink encasement in which the ink composition is encased, a recording head that ejects the ink composition, and a carriage configured to move the recording head back and forth. The carriage carries the ink encasement, with the ink encasement integrated with the carriage. The ink encasement has an ink fill port that opens and shuts as a port through which the ink composition is loaded and also has a detector that detects the amount of ink composition encased. The following describes an ink jet recording apparatus according to this embodiment.

1.2. Structure of the Ink Jet Recording Apparatus

An ink jet recording apparatus according to this embodiment includes an ink composition as described above. The following outlines its structure excluding the ink composition by taking an ink jet recording apparatus 1 as an example. The ink jet recording apparatus 1 includes an ink composition, an ink encasement 7 in which the ink composition is encased, a recording head 3 that ejects the ink composition, and a carriage 4 configured to move the recording head 3 back and forth. The carriage 4 carries the ink encasement 7, with the ink encasement 7 integrated with the carriage 4. The ink encasement 7 has an ink fill port 71 that opens and shuts as a port through which the ink composition is loaded and also has a detector 80 that detects the amount of ink composition encased. In the drawings referenced in the following description, the scale may vary from element to element so that each element is recognizable.

The recording head 3 is a liquid ejector that ejects tiny droplets of the ink composition. Using this recording head 3, the ink jet recording apparatus 1 attaches droplets to a recording medium 2. FIG. 1 is an outline perspective diagram illustrating the ink jet recording apparatus 1.

As illustrated in FIG. 1, the ink jet recording apparatus 1 has a recording head 3, a carriage 4, a main scanning mechanism 5, a platen roller 6, and a control unit (not illustrated) that controls the overall operation of the ink jet recording apparatus 1. The carriage 4 carries the recording head 3 and ink encasements 7a, 7b, 7c, and 7d in which ink compositions to be supplied to the recording head 3 are contained. That is, the carriage 4 moves the recording head 3 back and forth and carries ink encasements 7a, 7b, 7c, and 7d, with the ink encasements 7a, 7b, 7c, and 7d integrated with the carriage 4. The illustrated ink encasements 7a, 7b, 7c, and 7d each represent an example of an ink encasement 7.

The ink encasements 7a, 7b, 7c, and 7d are immobilized and cannot be detached from the carriage 4 by the user. That is, the carriage 4 carries an ink encasement 7 integrated therewith. The integration between the carriage 4 and the ink encasement 7 may be achieved by producing the ink encasement 7 separately from the carriage 4 and screwing, gluing with an adhesive agent, or otherwise fastening it to the carriage 4, or may be achieved by monolithically forming the carriage 4 and the ink encasement 7. With the ink encasements 7a, 7b, 7c, and 7d immobilized on the carriage 4, the user can access their ink fill port 71, which opens and shuts, to fill, refill, etc., the ink encasements 7a, 7b, 7c, and 7d with ink compositions. The details of the ink encasement 7 will be discussed later herein.

The main scanning mechanism 5 has a timing belt 8 coupled to the carriage 4, a motor 9 that drives the timing belt 8, and a guide shaft 10. The guide shaft 10 extends in the direction in which the carriage 4 moves, or in the main scanning direction, and serves as a support for the carriage 4. The carriage 4 is driven by the motor 9 via the timing belt 8 to move back and forth along the guide shaft 10. In this way, the main scanning mechanism 5 moves the carriage 4 back and forth in the main scanning direction.

The platen roller 6 transports a recording medium 2, on which a record is produced, in a sub-scanning direction perpendicular to the main scanning direction, or along the length of the recording medium 2. The recording medium 2 is therefore transported in the sub-scanning direction. The carriage 4 moves back and forth in the main scanning direction with the recording head 3 and ink encasements 7a, 7b, 7c, and 7d thereon, and the main scanning direction is substantially identical to the direction along the width of the recording medium 2. As a result, the recording head 3 moves in the main and sub-scanning directions relative to the recording medium 2.

The ink encasements 7a, 7b, 7c, and 7d are four independent ink encasements. The same or different ink compositions can be encased in the ink encasements 7a, 7b, 7c, and 7d. These ink encasements separately contain ink compositions, for example in the colors of black, cyan, magenta, and yellow, and can be used in any combination. The number of ink encasements does not need to be four as illustrated in FIG. 1. On the bottom of the ink encasements 7a, 7b, 7c, and 7d is a supply port (hidden in FIG. 1) through which the ink composition contained is supplied to the recording head 3. By virtue of integration with the carriage 4, the ink encasements 7a, 7b, 7c, and 7d, unlike cartridges, do not expose their supply port to the outside. This helps reduce contamination through the supply port, such as air entrainment.

The recording head 3 ejects ink compositions supplied from the ink encasements 7a, 7b, 7c, and 7d and attaches them to a recording medium 2 through multiple nozzles under the control of the control unit (not illustrated). On its surface facing the recording medium 2 to which the ink compositions are attached, the recording head 3 has multiple nozzles (hidden in FIG. 1) through which it ejects the ink compositions and attaches them to the recording medium 2. These multiple nozzles are lined up to form nozzle lines, and there are separate nozzle lines for ink compositions in different colors. Each ink composition is supplied from an ink encasement to the recording head 3 and ejected as droplets through the nozzles by the action of actuators (not illustrated) provided inside the recording head 3. The ejected droplets of ink compositions land on the recording medium 2, forming an image, text, a pattern, an expression of colors, etc., of the ink compositions on the recording medium 2.

The recording head 3 uses piezoelectric elements as driving actuators, but this is not the only possible mode of driving. For example, the actuators may be electromechanical transducers, which displace a diaphragm as an actuator using electrostatic attraction, or electrothermal transducers, which eject droplets of an ink composition using bubbles generated by heating.

In the X—Y—Z coordinate system illustrated in FIG. 1, the X direction is the direction in which the recording head 3 and ink encasements 7a, 7b, 7c, and 7d move (i.e., the direction in which the carriage 4 moves) and at the same time is along the width of the ink jet recording apparatus 1.

The Y direction represents the direction along the depth of the ink jet recording apparatus 1 (i.e., the direction in which the recording medium 2 moves), and the Z direction represents the direction along the height of the ink jet recording apparatus 1. In FIG. 1, the +Y direction is toward the front of the ink jet recording apparatus 1, whereas the −Y direction is toward the back or rear of the ink jet recording apparatus 1. In the front view of the ink jet recording apparatus 1, the direction toward the right is the +X direction, and that toward the left is the −X direction. The +Z direction is toward the top (including the upper portion, the top surface, etc.) of the ink jet recording apparatus 1, and the −Z direction is toward the bottom (including the lower portion, the bottom surface, etc.) of the ink jet recording apparatus 1.

1.3. Ink Encasement

Figure 2:
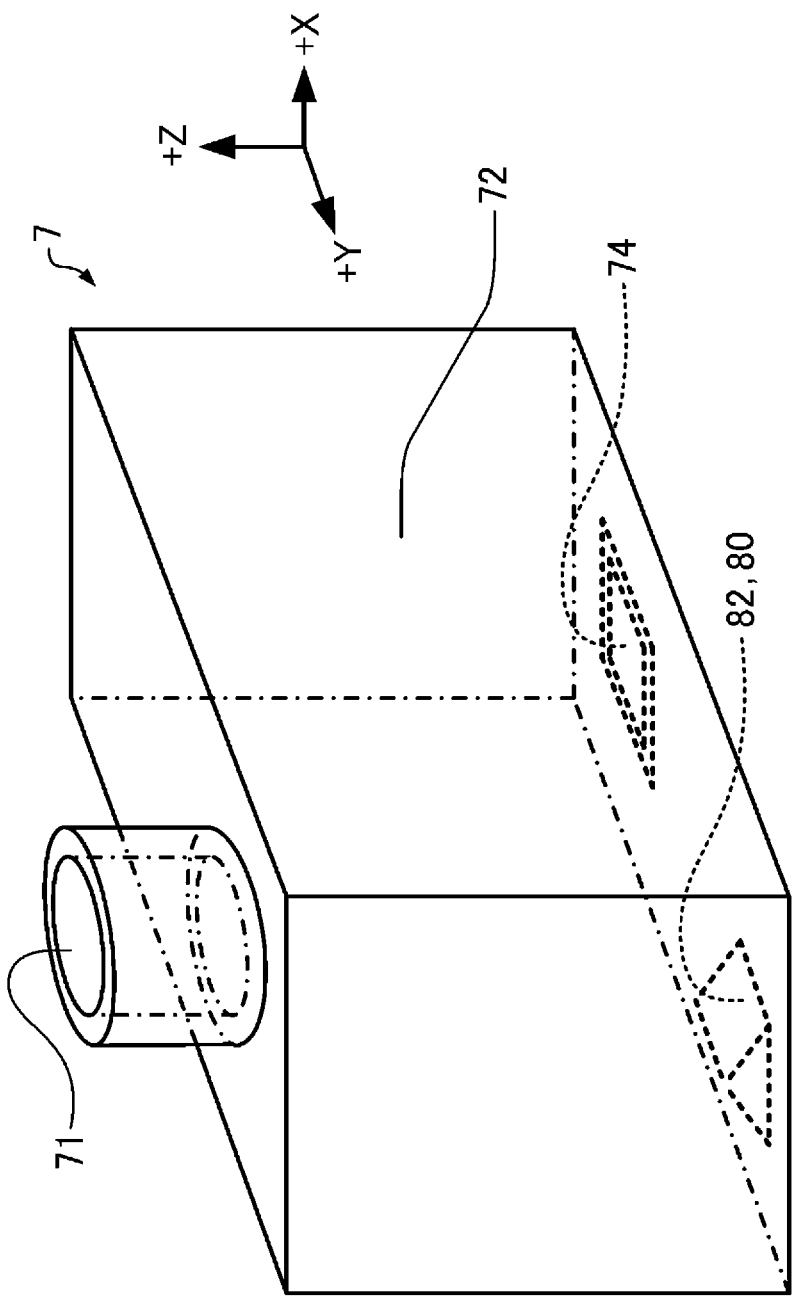
FIG. 2 is a perspective diagram schematically illustrating an ink encasement according to an embodiment.

This ink jet recording apparatus 1 has four ink encasements, ink encasements 7a, 7b, 7c, and 7d, and all of them have an ink fill port 71 that opens and shuts as a port through which an ink composition is loaded and also have a detector 80 that detects the amount of ink composition encased. In the following, an ink encasement 7 that can be used as any of the ink encasements 7a, 7b, 7c, and 7d is described with reference to FIG. 2. FIG. 2 is a perspective diagram schematically illustrating the ink encasement 7. In the X—Y—Z coordinate system illustrated in FIG. 2, the X direction is the direction in which the recording head 3 and ink encasement 7 move (i.e., the direction in which the carriage 4 moves).

1.3.1. Shape and Other Details of the Ink Encasement

The ink encasement 7 has at least an ink fill port 71 that opens and shuts as a port through which an ink composition is loaded and a detector 80 that detects the amount of ink composition encased. In the example illustrated in FIG. 2, the ink encasement 7 has an ink fill port 71, an encasing chamber 72, a prism 82 as a component a detector 80, and an ink discharge port 74.

The encasing chamber 72 encases an ink composition. The encasing chamber 72 has a substantially rectangular parallelepiped shape, defined by the encasement's frame. The walls that define the encasing chamber 72 are of, for example, a shaped plastic article or film. Preferably, the walls that define the encasing chamber 72 are of polypropylene. The schematic in FIG. 2 assumes that the encasement's frame has no thickness. The encasing chamber 72 and the frame can be in any shape as long as the ink encasement 7 can encase and eject an ink composition and can be immobilized on the carriage 4. For example, the ink encasement 7 may have inside the encasing chamber 72 a component that reinforces the structural strength of its frame, such as ribs or a pillar.

The ink encasement 7 is narrow in the X direction, and the X direction is identical to the direction in which the carriage 4 moves (main scanning direction). As the carriage 4 moves, the ink encasement 7 thereon is rocked in the X direction. The width, in the X direction, of the ink encasement 7 is 1 cm or more and 10 cm or less for example, preferably 2 cm or more and 7 cm or less. When the ink encasement 7 has such a width, in the X direction, the maximum width, in the X direction, of the encasing chamber 72 can be 0.6 cm or more, preferably 1.6 cm or more.

The capacity of the encasing chamber 72 is greater than that of ordinary ink cartridges. For example, the encasing chamber 72 has a capacity of 10 mL or more and 500 mL or less, preferably 20 mL or more and 300 mL or less, more preferably 30 mL or more and 200 mL or less, even more preferably 50 mL or more and 200 mL or less.

As stated, the ink encasement 7 is rocked as the carriage 4 moves. Designing the ink encasement 7 and the encasing chamber 72 with such dimensions as given above ensures that this rocking motion shakes and stirs the encased ink composition.

The encasing chamber 72 communicates with the ink fill port 71 and the ink discharge port 74. The ink fill port 71 is an opening that communicates with the encasing chamber 72. The ink fill port 71 is above the encasing chamber 72 (up in the Z direction). The ink fill port 71 has a lid not illustrated. The lid opens and shuts and is manipulated, for example by the user, when the ink encasement 7 is refilled with the ink composition or for other needs. A check valve, which automatically opens and shuts, in a passage through which the ink composition flows cannot be the lid.

The ink discharge port 74 is an opening that communicates with the encasing chamber 72. The ink discharge port 74 is below the encasing chamber 72 (down in the Z direction). The ink discharge port 74 is an opening through which the ink composition encased in the encasing chamber 72 is discharged toward the recording head 3. The ink discharge port 74 may have, for example, a filter not illustrated.

The ink composition is introduced through the ink fill port 71 into the encasing chamber 72 and discharged through the ink discharge port 74. An ink composition introduced into the encasing chamber 72 accumulates in the lower portion (down in the Z direction) by the action of the force of gravity, with a gas in the upper portion (up in the Z direction). When an ink composition is ejected from the recording head 3 in a recording job performed using the ink jet recording apparatus 1, an appropriate volume, based on the volume that should be ejected, of the ink composition is discharged through the ink discharge port 74. The ink encasement 7 may have an opening or valve that regulates the pressure inside its encasing chamber 72.

Preferably, the ink composition comes into contact with the material forming the encasing chamber 72 at an angle of 45° or less. More preferably, the angle of contact between the ink composition and the material forming the encasing chamber 72 is 40° or less, even more preferably 35° or less. An angle of contact of 45° or less is advantageous in that it prevents air entrainment, especially in initial loading, thereby helping avoid air bubbles in the ink composition.

1.3.2. Detector

The detector 80 detects the amount of ink composition encased. Preferably, the detector 80 is one that provides optical detection of the amount of ink composition encased. The optical detection of the amount of ink composition encased may be based on changes in light from a light source. For example, the detector 80 may use a prism 82 (as described later herein) or may have a window, such as a condenser lens, near the bottom of the ink encasement through which the detector 80 can detect changes in the transmission of light across the ink encasement. Preferably, one of the components of the detector 80 is a prism 82. The following describes a detector 80 that uses a prism 82 by way of example. Although not described in detail, the detector 80 may be one that provides electrical detection of the amount of ink composition encased.

As illustrated in FIG. 2, the ink encasement 7 has a prism 82 in its bottom (lower surface in the Z direction) as a component of the detector 80. Part of the prism 82 is inside the encasing chamber 72.

FIGS. 3A to 3C and 4 are schematic projections in the Y direction of the vicinity of the bottom of the ink encasement 7. As illustrated in FIGS. 3A to 3C and 4, the prism 82 is a triangular prism. The prism 82 has a first surface 82*a*, a second surface 82*b*, and a third surface 82*c*. The first and second surfaces 82*a* and 82*b* border the encasing chamber 72. When the encasing chamber 72 encases a sufficient amount of ink composition, therefore, the first and second surfaces 82*a* and 82*b* touch the ink composition. The first and second surfaces 82*a* and 82*b* are perpendicular to each other, which means the prism 82 reflects an incident beam of laser light (described later herein) back in the opposite direction, with the incident and reflected beams parallel with each other.

The third surface 82*c* faces outward from the ink encasement 7. The third surface 82*c* is outside the ink encasement 7 and is parallel with the bottom of the ink encasement 7.

The ink jet recording apparatus 1 has a sensor 90 for detecting the ink composition level in the ink encasement 7. The sensor 90 is fitted to the body or the carriage 4 of the ink jet recording apparatus 1 and positioned to face the bottom of the ink encasement 7. The sensor 90 may face the bottom of the ink encasement 7 only when the carriage 4 is in a particular position, or may be fitted to the carriage 4 to always face the bottom of the ink encasement 7. Alternatively, the sensor 90 may face the bottom of the ink encasement 7 while the carriage 4 moves over it, without stopping.

As illustrated in FIGS. 3A to 3C and 4, the sensor 90 has a light emitter 92 that emits light toward the prism 82, and also has a light receiver 94 that receives light reflected from the prism 82.

When the detector 80 detects the ink composition level in the ink encasement 7, or the amount of ink composition remaining in the encasing chamber 72, the light emitter 92 emits light toward the prism 82 positioned right above. The light emitted from the light emitter 92 hits the third surface 82*c* and enters the prism 82. The light that enters the prism 82 then travels inside the prism 82, thereby hitting the first surface 82*a*. The light that hits the first surface 82*a* is refracted or reflects off the first surface 82*a*.

When the ink composition is in contact with the portion of the first surface 82*a* hit by the light, e.g., when there is a large amount of ink composition remaining in the encasing chamber 72, the light that hits the first surface 82*a* is refracted by the first surface 82*a*, because of a small difference between the refractive index of the prism 82 and that of the ink composition (see FIGS. 3A and 3B).

The light refracted by the first surface 82*a* travels from the inside to the outside of the prism 82. That is, the light refracted by the first surface 82*a* travels inside the encasing chamber 72. When the ink composition level in the encasing chamber 72 is sufficiently high, therefore, a large part of the light emitted from the light emitter 92 passes through the prism 82 (see FIGS. 3A and 3B).

When no ink composition is in contact with the portion of the first surface 82*a* hit by the light, e.g., there is only a small amount of ink composition remaining in the encasing chamber 72, the light that hits the first surface 82*a* reflects off the first surface 82*a*, because of a large difference between the refractive index of the prism 82 and that of air (see FIGS. 3A and 3C).

The light that reflects off the first surface 82*a* travels inside the prism 82. When the ink composition level in the encasing chamber 72 is low, therefore, the light that hits the first surface 82*a* reflects off the first surface 82*a*, thereby traveling inside the prism 82.

In this way, the light that hits the first surface 82*a* travels in different directions depending on whether the ink composition level is high or low in the encasing chamber 72.

The light that reflects off the first surface 82*a* travels inside the prism 82, thereby hitting the second surface 82*b*. The light that hits the second surface 82*b* is refracted or reflects off the second surface 82*b*, in the same way as at the first surface 82*a*.

When the ink composition is in contact with the portion of the second surface 82*b* hit by the light, the light that hits the second surface 82*b* is refracted by the second surface 82*b*. The light refracted by the second surface 82*b* travels inside the encasing chamber 72.

When no ink composition is in contact with the portion of the second surface 82*b* hit by the light, the light that hits the second surface 82*b* reflects off the second surface 82*b*. The light that reflects off the second surface 82*b* travels inside the prism 82 (see FIG. 3C).

In this way, the light that hits the second surface 82*b* travels in different directions depending on whether the ink composition level is high or low in the encasing chamber 72.

The light that reflects off the second surface 82*b* travels from the inside to the outside of the prism 82 through the third surface 82*c*. Then the light goes toward the light receiver 94 and is received by the light receiver (see FIG. 3C).

Overall, when there is a large enough amount of ink composition remaining in the encasing chamber 72 that the ink composition touches one or both of the first and second surfaces 82*a* and 82*b* of the prism 82, the light receiver 94 receives little light because a large part of the light emitted from the light emitter 92 passes through the prism 82. When there is so small an amount of ink composition remaining in the encasing chamber 72 that no ink composition touches the first and second surfaces 82*a* and 82*b* of the prism 82, the light receiver 94 receives much light because a large part of the light emitted from the light emitter 92 is reflected by the prism 82.

The reflectance of light at the prism 82, therefore, changes according to the ink composition level in the encasing chamber 72. As the reflectance of light at the prism 82 changes, the amount of light received by the light receiver 94 changes.

The ink jet recording apparatus 1 detects the amount of ink composition remaining based on the amount of light received by the light receiver 94. For example, when the amount of light received by the light receiver 94 is equal to or greater than a threshold, the ink jet recording apparatus 1 recognizes it as the ink composition level being lower than a predetermined limit. When the amount of light received by the light receiver 94 is smaller than a threshold, the ink jet recording apparatus 1 recognizes it as the ink composition level being equal to or higher than a predetermined limit. The detector 80 therefore provides optical detection of the amount of ink composition encased.

In the encasing chamber 72, however, bubbles B may adhere to the prism 82 as illustrated in FIG. 4. In the example illustrated in FIG. 4, there are bubbles B on the first and second surfaces 82*a* and 82*b*. When the light emitted from the light emitter 92 hits a portion of the first and second surfaces 82*a* and 82*b* bearing a bubble B, the light reflects off the first and second surface 82*a* and 82*b* as indicated by a light path in FIG. 4. A hit of the light emitted from the light emitter 92 on a portion of the first and second surfaces 82*a* and 82*b* bearing a bubble B can therefore cause an increased amount of light received by the light receiver 94.

The ink jet recording apparatus 1 uses a large ink encasement 7 compared with ordinary ink cartridges. As the carriage 4 moves, therefore, the ink composition encased therein is rocked. A known ink composition can foam in this rocked situation. When the user refills the ink encasement 7, furthermore, a known ink composition can entrain air while falling down in the encasement 7. The ink composition according to this embodiment, by contrast, is unlikely to foam, and, even when it forms, the foam quickly vanishes. With the ink composition according to this embodiment, therefore, it is unlikely that bubbles B adhere to the first and second surfaces 82a and 82b, helping reduce false detections by the sensor 90.

1.3.3. Surface Treatment of the Detector

At least part of the surface of the prism 82 of the detector 80 may be water-repellent. That is, the surfaces of the prism 82 of the detector 80 the ink composition can touch may have been treated for water repellency. For example, the first and second surfaces 82a and 82b of the prism 82 may be treated with a siloxane or fluorine water-repellent agent. Such a treatment prevents bubbles from adhering to the prism 82 and ensures any bubble that adheres to or forms on the surface of the prism 82 will easily detach, for example when the ink composition is rocked.

Examples of siloxane water-repellent agents include Münzing's FOAM BAN® MS-575 (trade name), Wacker Asahikasei Silicone's NP-2804 (trade name), and NOF's MODIPER® FS770. Coating the prism 82 with such an agent renders it water-repellent.

Examples of fluorine water-repellent agents include Fluoro Surf® FG5010, Fluoro Surf® FG5020, Fluoro Surf® FG5060, and Fluoro Surf® FG5070 (Fluoro Technology Co., Ltd.), OPTOOL® DSX (Daikin Industries, Ltd.), Krytox® FSL and Krytox® FSH (DuPont), Fomblin® Z (Solvay Solexis), Fluorolink® S10 and Fluorolink® C10 (Solvay Solexis), Moresco Phospharol A20H, Moresco Phospharol ADOH, and Moresco Phospharol DDOH (Matsumura Oil Research Corp.), and AsahiGuard E-SERIES AG-E061 (AGC). Coating the prism 82 with such an agent renders it water-repellent.

Of such water-repellent treatments, treatment with a siloxane agent is preferred. A siloxane compound, such as a polyorganosiloxane, on at least part of the surface of the prism 82 provides enhanced bubble repellency.

2. Ink Jet Recording Method

An ink jet recording method according to this embodiment is a recording method in which an ink jet recording apparatus is used that includes an ink composition, an ink encasement in which the ink composition is encased, a recording head that ejects the ink composition, and a carriage configured to move the recording head back and forth. The carriage carries the ink encasement, with the ink encasement integrated with the carriage. The ink encasement has an ink fill port that opens and shuts as a port through which the ink composition is loaded and also has a detector that detects the amount of ink composition encased. The ink composition contains a surfactant with an HLB of 6 or less. The method includes ejecting the ink composition from the recording head to attach the ink composition to a recording medium.

The recording medium can be of any kind. It may have a recording surface that absorbs liquids or may have no such recording surface. Any kind of recording medium can therefore be used. Examples include paper, film, cloth, metal, glass, and polymers.

3. Examples and Comparative Examples

The following describes an aspect of the present disclosure in detail by providing examples, but no aspect of the disclosure is limited to these Examples. In the following, "parts" and "%" are by mass unless stated otherwise. All tests were performed under the conditions of a temperature of 25° C. and a relative humidity of 40% unless specified otherwise.

3.1. Preparation of Ink Compositions

Tables 1 to 3 summarize the formulae of the ink compositions of Examples and Comparative Examples. Each ink composition was prepared by mixing the ingredients specified in Tables 1 to 3, stirring them for 30 minutes or longer, and filtering the mixture. The mixing of the ingredients was by adding the materials one by one to a container equipped with a mechanical stirrer and then stirring and mixing the materials. The resulting mixture was filtered to complete the ink composition of the Example or Comparative Example (Examples 1 to 28 and Comparative Examples 1 to 7). In Tables 1 to 3, the numerical values representing the amounts of ingredients are in the unit of % by mass.

TABLE 1

| | | | Examples | | | | | |
|---|---|---|---|---|---|---|---|---|
| | | | 1 | 2 | 3 | 4 | 5 | 6 |
| Common formula | | Colorant (C.I. Direct Blue 199) | 4.0 | 4.0 | 4.0 | 4.0 | 4.0 | 4.0 |
| | | Glycerol | 9.0 | 9.0 | 9.0 | 9.0 | 9.0 | 9.0 |
| | | Triethylene glycol | 7.0 | 7.0 | 7.0 | 7.0 | 7.0 | 7.0 |
| | | 2-Pyrrolidone | 3.0 | 3.0 | 3.0 | 3.0 | 3.0 | 3.0 |
| | | Triethylene glycol monobutyl ether | 8.0 | 8.0 | 8.0 | 8.0 | 8.0 | 8.0 |
| | | 1,2-Hexanediol | 3.0 | 3.0 | 3.0 | 3.0 | 3.0 | 3.0 |
| | | Triethanolamine | 0.2 | 0.2 | 0.2 | 0.2 | 0.2 | 0.2 |
| | | EDTA•2Na | 0.02 | 0.02 | 0.02 | 0.02 | 0.02 | 0.02 |
| Surfactant(s) with an HLB of 6 or less | Acetylene glycol surfactants | Surfynol DF110D (HLB = 3) | — | — | — | — | — | 0.2 |
| | | Surfynol 104PG-50 (HLB = 4) | 0.5 | — | — | 0.5 | — | — |
| | | Surfynol 61 (HLB = 6) | — | 0.5 | — | — | 0.5 | — |
| | Silicone surfactant | KF-945 (HLB = 4) | — | — | 0.5 | — | — | — |
| Polyoxyalkylene alkyl ether | | NOIGEN DL-0415 (HLB = 15.0) | — | — | — | — | — | — |
| | | Newcol 1006 (HLB = 13.4) | 1.7 | 1.7 | 1.7 | 1.7 | 1.7 | 1.7 |
| | | NOIGEN ET-116B (HLB = 12.0) | — | — | — | — | — | — |
| | | NOIGEN ET-106A (HLB = 10.9) | — | — | — | — | — | — |
| Amphoteric surfactant | | Betaine surfactant (myristyl betaine) | — | — | — | — | — | — |
| Other surfactants | | OLFINE E1004 (HLB = 7 to 9) | — | — | — | — | — | — |
| | | OLFINE E1010 (HLB = 13 to 14) | — | — | — | — | — | — |
| | Purified water | | Balance | Balance | Balance | Balance | Balance | Balance |

TABLE 1-continued

|  |  | | | | | | |
|---|---|---|---|---|---|---|---|
| Polyoxyalkylene alkyl ether/surfactant(s) with an HLB of 6 or less | | 3.40 | 3.40 | 3.40 | 3.40 | 3.40 | 3.40 |
| Water-repellent treatment | Siloxane (S) or fluorine (F) agent | — | — | — | S | S | S |
| Test results | False detections of ink level | B | B | B | A | A | B |
|  | Ejection stability | A | B | B | A | B | B |
|  | Moisture resistance | B | B | B | B | B | B |

|  |  | Examples | | | | | |
|---|---|---|---|---|---|---|---|
|  |  | 7 | 8 | 9 | 10 | 11 | 12 |
| Common formula | Colorant (C.I. Direct Blue 199) | 4.0 | 4.0 | 4.0 | 4.0 | 4.0 | 4.0 |
|  | Glycerol | 9.0 | 9.0 | 9.0 | 9.0 | 9.0 | 9.0 |
|  | Triethylene glycol | 7.0 | 7.0 | 7.0 | 7.0 | 7.0 | 7.0 |
|  | 2-Pyrrolidone | 3.0 | 3.0 | 3.0 | 3.0 | 3.0 | 3.0 |
|  | Triethylene glycol monobutyl ether | 8.0 | 8.0 | 8.0 | 8.0 | 8.0 | 8.0 |
|  | 1,2-Hexanediol | 3.0 | 3.0 | 3.0 | 3.0 | 3.0 | 3.0 |
|  | Triethanolamine | 0.2 | 0.2 | 0.2 | 0.2 | 0.2 | 0.2 |
|  | EDTA·2Na | 0.02 | 0.02 | 0.02 | 0.02 | 0.02 | 0.02 |
| Surfactant(s) with an HLB of 6 or less — Acetylene glycol surfactants | Surfynol DF110D (HLB = 3) | — | — | — | — | — | 0.2 |
|  | Surfynol 104PG-50 (HLB = 4) | 0.5 | 0.5 | 0.5 | 0.5 | 0.5 | 0.5 |
|  | Surfynol 61 (HLB = 6) | — | — | — | — | — | — |
| Silicone surfactant | KF-945 (HLB = 4) | — | — | — | — | — | — |
| Polyoxyalkylene alkyl ether | NOIGEN DL-0415 (HLB = 15.0) | — | — | 1.7 | — | — | — |
|  | Newcol 1006 (HLB = 13.4) | 1.7 | — | — | — | — | 1.7 |
|  | NOIGEN ET-116B (HLB = 12.0) | — | — | — | 1.7 | — | — |
|  | NOIGEN ET-106A (HLB = 10.9) | — | — | — | — | 1.7 | — |
| Amphoteric surfactant | Betaine surfactant (myristyl betaine) | — | — | — | — | — | 2.5 |
| Other surfactants | OLFINE E1004 (HLB = 7 to 9) | — | — | — | — | — | — |
|  | OLFINE E1010 (HLB = 13 to 14) | — | — | — | — | — | — |
| Purified water | | Balance | Balance | Balance | Balance | Balance | Balance |
| Polyoxyalkylene alkyl ether/surfactant(s) with an HLB of 6 or less | | 3.40 | — | 3.40 | 3.40 | 3.40 | 3.40 |
| Water-repellent treatment | Siloxane (S) or fluorine (F) agent | F | S | S | S | S | S |
| Test results | False detections of ink level | B | B | A | A | B | A |
|  | Ejection stability | A | A | A | A | A | A |
|  | Moisture resistance | B | B | B | B | B | A |

TABLE 2

|  |  | Examples | | | | | |
|---|---|---|---|---|---|---|---|
|  |  | 13 | 14 | 15 | 16 | 17 | 18 |
| Common formula | Colorant (C.I. Direct Blue 199) | 4.0 | 4.0 | 4.0 | 4.0 | 4.0 | 4.0 |
|  | Glycerol | 9.0 | 9.0 | 9.0 | 9.0 | 9.0 | 9.0 |
|  | Triethylene glycol | 7.0 | 7.0 | 7.0 | 7.0 | 7.0 | 7.0 |
|  | 2-Pyrrolidone | 3.0 | 3.0 | 3.0 | 3.0 | 3.0 | 3.0 |
|  | Triethylene glycol monobutyl ether | 8.0 | 8.0 | 8..0 | 8.0 | 8.0 | 8.0 |
|  | 1,2-Hexanediol | 3.0 | 3.0 | 3.0 | 3.0 | 3.0 | 3.0 |
|  | Triethanolamine | 0.2 | 0.2 | 0.2 | 0.2 | 0.2 | 0.2 |
|  | EDTA·2Na | 0.02 | 0.02 | 0.02 | 0.02 | 0.02 | 0.02 |
| Surfactant(s) with an HLB of 6 or less — Acetylene glycol surfactants | Surfynol DF110D (HLB = 3) | — | — | — | — | — | — |
|  | Surfynol 104PG-50 (HLB = 4) | 0.5 | 0.2 | 0.2 | 0.2 | 0.2 | 0.2 |
|  | Surfynol 61 (HLB = 6) | — | — | — | — | — | — |
| Silicone surfactant | KF-945 (HLB = 4) | — | — | — | — | — | — |
| Polyoxyalkylene alkyl ether | NOIGEN DL-0415 (HLB = 15.0) | — | — | — | — | — | — |
|  | Newcol 1006 (HLB = 13.4) | 1.7 | 0.5 | 1.2 | 1.4 | 2.0 | 3.0 |
|  | NOIGEN ET-116B (HLB = 12.0) | — | — | — | — | — | — |
|  | NOIGEN ET-106A (HLB = 10.9) | — | — | — | — | — | — |
| Amphoteric surfactant | Betaine surfactant (myristyl betaine) | 2.5 | — | — | — | — | — |
| Other surfactants | OLFINE E1004 (HLB = 7 to 9) | — | — | — | — | — | — |
|  | OLFINE E1010 (HLB = 13 to 14) | — | — | — | — | — | — |
| Purified water | | Balance | Balance | Balance | Balance | Balance | Balance |
| Polyoxyalkylene alkyl ether/surfactant(s) with an HLB of 6 or less | | 3.40 | 2.50 | 6.00 | 7.00 | 10.0 | 15.0 |
| Water-repellent treatment | Siloxane (S) or fluorine (F) agent | S | S | S | S | S | S |
| Test results | False detections of ink level | A | A | B | B | B | B |
|  | Ejection stability | B | A | A | B | B | B |
|  | Moisture resistance | A | B | B | B | B | B |

|  |  | Examples | | | | | |
|---|---|---|---|---|---|---|---|
|  |  | 19 | 20 | 21 | 22 | 23 | 24 |
| Common formula | Colorant (C.I. Direct Blue 199) | 4.0 | 4.0 | 4.0 | 4.0 | 4.0 | 4.0 |
|  | Glycerol | 9.0 | 9.0 | 9.0 | 9.0 | 9.0 | 9.0 |
|  | Triethylene glycol | 7.0 | 7.0 | 7.0 | 7.0 | 7.0 | 7.0 |
|  | 2-Pyrrolidone | 3.0 | 3.0 | 3.0 | 3.0 | 3.0 | 3.0 |
|  | Triethylene glycol monobutyl ether | 8.0 | 8.0 | 8.0 | 8.0 | 8.0 | 8.0 |

TABLE 2-continued

|  |  |  |  |  |  |  |  |  |
|---|---|---|---|---|---|---|---|---|
|  |  | 1,2-Hexanediol | 3.0 | 3.0 | 3.0 | 3.0 | 3.0 | 3.0 |
|  |  | Triethanolamine | 0.2 | 0.2 | 0.2 | 0.2 | 0.2 | 0.2 |
|  |  | EDTA•2Na | 0.02 | 0.02 | 0.02 | 0.02 | 0.02 | 0.02 |
| Surfactant(s) with an HLB of 6 or less | Acetylene glycol surfactants | Surfynol DF110D (HLB = 3) | — | — | — | — | — | — |
|  |  | Surfynol 104PG-50 (HLB = 4) | 0.5 | 0.5 | 0.5 | 0.5 | 0.5 | 0.8 |
|  |  | Surfynol 61 (HLB = 6) | — | — | — | — | — | — |
|  | Silicone surfactant | KF-945 (HLB = 4) | — | — | — | — | — | — |
| Polyoxyalkylene alkyl ether |  | NOIGEN DL-0415 (HLB = 15.0) | — | — | — | — | — | — |
|  |  | Newcol 1006 (HLB = 13.4) | 0.5 | 1.2 | 1.4 | 2.0 | 3.0 | 0.5 |
|  |  | NOIGEN ET-116B (HLB = 12.0) | — | — | — | — | — | — |
|  |  | NOIGEN ET-106A (HLB = 10.9) | — | — | — | — | — | — |
| Amphoteric surfactant |  | Betaine surfactant (myristyl betaine) | — | — | — | — | — | — |
| Other surfactants |  | OLFINE E1004 (HLB = 7 to 9) | — | — | — | — | — | — |
|  |  | OLFINE E1010 (HLB = 13 to 14) | — | — | — | — | — | — |
| Purified water |  |  | Balance | Balance | Balance | Balance | Balance | Balance |
| Polyoxyalkylene alkyl ether/surfactant(s) with an HLB of 6 or less |  |  | 1.00 | 2.40 | 2.80 | 4.00 | 6.00 | 0.63 |
| Water-repellent treatment |  | Siloxane (S) or fluorine (F) agent | S | S | S | S | S | S |
| Test results |  | False detections of ink level | A | A | A | A | A | A |
|  |  | Ejection stability | A | A | A | A | A | B |
|  |  | Moisture resistance | B | B | B | B | B | B |

TABLE 3

|  |  |  | Examples |  |  |  | Comparative Examples |  |
|---|---|---|---|---|---|---|---|---|
|  |  |  | 25 | 26 | 27 | 28 | 1 | 2 |
| Common formula |  | Colorant (C.I. Direct Blue 199) | 4.0 | 4.0 | 4.0 | 4.0 | 4.0 | 4.0 |
|  |  | Glycerol | 9.0 | 9.0 | 9.0 | 9.0 | 9.0 | 9.0 |
|  |  | Triethylene glycol | 7.0 | 7.0 | 7.0 | 7.0 | 7.0 | 7.0 |
|  |  | 2-Pyrrolidone | 3.0 | 3.0 | 3.0 | 3.0 | 3.0 | 3.0 |
|  |  | Triethylene glycol monobutyl ether | 8.0 | 8.0 | 8.0 | 8.0 | 8.0 | 8.0 |
|  |  | 1,2-Hexanediol | 3.0 | 3.0 | 3.0 | 3.0 | 3.0 | 3.0 |
|  |  | Triethanolamine | 0.2 | 0.2 | 0.2 | 0.2 | 0.2 | 0.2 |
|  |  | EDTA•2Na | 0.02 | 0.02 | 0.02 | 0.02 | 0.02 | 0.02 |
| Surfactant(s) with an HLB of 6 or less | Acetylene glycol surfactants | Surfynol DF110D (HLB = 3) | — | — | — | — | — | — |
|  |  | Surfynol 104PG-50 (HLB = 4) | 0.8 | 0.8 | 0.8 | 0.8 | — | — |
|  |  | Surfynol 61 (HLB = 6) | — | — | — | — | — | — |
|  | Silicone surfactant | KF-945 (HLB = 4) | — | — | — | — | — | — |
| Polyoxyalkylene alkyl ether |  | NOIGEN DL-0415 (HLB = 15.0) | — | — | — | — | — | — |
|  |  | Newcol 1006 (HLB = 13.4) | 1.2 | 1.4 | 2.0 | 3.0 | 1.7 | 1.7 |
|  |  | NOIGEN ET-116B (HLB = 12.0) | — | — | — | — | — | — |
|  |  | NOIGEN ET-106A (HLB = 10.9) | — | — | — | — | — | — |
| Amphoteric surfactant |  | Betaine surfactant (myristyl betaine) | — | — | — | — | — | — |
| Other surfactants |  | OLFINE E1004 (HLB = 7 to 9) | — | — | — | — | — | 0.5 |
|  |  | OLFINE E1010 (HLB = 13 to 14) | — | — | — | — | — | — |
| Purified water |  |  | Balance | Balance | Balance | Balance | Balance | Balance |
| Polyoxyalkylene alkyl ether/surfactant(s) with an HLB of 6 or less |  |  | 1.50 | 1.75 | 2.50 | 3.75 | — | 3.40 |
| Water-repellent treatment |  | Siloxane (S) or fluorine (F) agent | S | S | S | S | — | — |
| Test results |  | False detections of ink level | A | A | A | A | C | C |
|  |  | Ejection stability | A | A | A | A | C | C |
|  |  | Moisture resistance | B | B | B | B | B | B |

|  |  |  | Comparative Examples |  |  |  |  |
|---|---|---|---|---|---|---|---|
|  |  |  | 3 | 4 | 5 | 6 | 7 |
| Common formula |  | Colorant (C.I. Direct Blue 199) | 4.0 | 4.0 | 4.0 | 4.0 | 4.0 |
|  |  | Glycerol | 9.0 | 9.0 | 9.0 | 9.0 | 9.0 |
|  |  | Triethylene glycol | 7.0 | 7.0 | 7.0 | 7.0 | 7.0 |
|  |  | 2-Pyrrolidone | 3.0 | 3.0 | 3.0 | 3.0 | 3.0 |
|  |  | Triethylene glycol monobutyl ether | 8.0 | 8.0 | 8.0 | 8.0 | 8.0 |
|  |  | 1,2-Hexanediol | 3.0 | 3.0 | 3.0 | 3.0 | 3.0 |
|  |  | Triethanolamine | 0.2 | 0.2 | 0.2 | 0.2 | 0.2 |
|  |  | EDTA•2Na | 0.02 | 0.02 | 0.02 | 0.02 | 0.02 |
| Surfactant(s) with an HLB of 6 or less | Acetylene glycol surfactants | Surfynol DF110D (HLB = 3) | — | — | — | — | — |
|  |  | Surfynol 104PG-50 (HLB = 4) | — | — | — | — | — |
|  |  | Surfynol 61 (HLB = 6) | — | — | — | — | — |
|  | Silicone surfactant | KF-945 (HLB = 4) | — | — | — | — | — |
| Polyoxyalkylene alkyl ether |  | NOIGEN DL-0415 (HLB = 15.0) | — | — | — | — | — |
|  |  | Newcol 1006 (HLB = 13.4) | 1.7 | 1.7 | 1.7 | 1.7 | 1.7 |
|  |  | NOIGEN ET-116B (HLB = 12.0) | — | — | — | — | — |
|  |  | NOIGEN ET-106A (HLB = 10.9) | — | — | — | — | — |

TABLE 3-continued

| | | | | | | |
|---|---|---|---|---|---|---|
| Amphoteric surfactant | Betaine surfactant (myristyl betaine) | — | — | — | — | 2.5 |
| Other surfactants | OLFINE E1004 (HLB = 7 to 9) | — | — | 0.5 | — | — |
| | OLFINE E1010 (HLB = 13 to 14) | 0.5 | — | — | 0.5 | — |
| Purified water | | Balance | Balance | Balance | Balance | Balance |
| Polyoxyalkylene alkyl ether/surfactant(s) with an HLB of 6 or less | | 3.40 | — | 3.40 | 3.40 | 3.40 |
| Water-repellent treatment | Siloxane (S) or fluorine (F) agent | — | S | S | S | S |
| Test results | False detections of ink level | C | D | D | D | C |
| | Ejection stability | C | C | C | C | C |
| | Moisture resistance | B | B | B | B | A |

The abbreviated names of ingredients in Tables 1 to 3 represent the following materials.

Colorant: C.I. Direct Blue 199

EDTA-2Na: Disodium ethylenediaminetetraacetate (reagent grade)

Surfynol DF110D (HLB=3) (Nissin Chemical Industry Co., Ltd.)

Surfynol 104PG-50 (HLB=4) (Nissin Chemical Industry Co., Ltd.)

Surfynol 61 (HLB=6) (Nissin Chemical Industry Co., Ltd.)

KF-945 (HLB=4) (Shin-Etsu Chemical Co., Ltd.)

NOIGEN DL-0415 (HLB=15) (DKS Co., Ltd.)

Newcol 1006 (HLB=13.4) (Nippon Nyukazai Co., Ltd.)

NOIGEN ET-116B (HLB=12) (DKS Co., Ltd.)

NOIGEN ET-106A (HLB=10.9) (DKS Co., Ltd.)

OLFINE E1004 (HLB=7 to 9) (Nissin Chemical Industry Co., Ltd.), an acetylene glycol surfactant OLFINE E1010 (HLB=13 to 14) (Nissin Chemical Industry Co., Ltd.), an acetylene glycol surfactant Myristyl betaine (tetradecyl-N,N-dimethylglycine) (reagent grade)

Tables 1 to 3 include the ratio by mass of the polyoxyalkylene alkyl ether to the surfactant(s) with an HLB of 6 or less. Tables 1 to 3 also include data on whether the prism of the ink encasement of the test printer was treated for water repellency and the type of water-repellent treatment performed, a siloxane (S) or fluorine (F) agent. The prism was rendered water-repellent by coating it with Münzing's FOAM BAN MS-575 (polyorganosiloxane) as a siloxane (S) agent or with Fluoro Technology's Fluoro Surf® FG5010 as a fluorine (F) agent. Although not presented in the tables, the ink compositions of the Examples all came into contact at an angle of 40° or less with the inner wall of the ink tank used in the testing described below.

3.2. Testing

The ink compositions of the Examples and Comparative Examples were tested as follows. A test result labeled "-" means that the test was impossible.

3.2.1. False Detections of the Ink Level

Seiko Epson Corporation's PX-S170T was modified by attaching a prism sensor for the ink level to make a test printer whose ink tank was immobilized on a carriage and had an ink fill port. The prism sensor was placed in the bottom of the polypropylene ink tank. The printer was loaded with an ink composition equilibrated under 10° C. conditions and operated to perform initial loading under 10° C. conditions. Then an A4 solid pattern was printed continuously on 50 sheets of ordinary printing paper with the printer's standard settings. The whole printer was then left under 40° C. conditions for 5 hours, and an A4 solid pattern was printed continuously on 50 sheets of ordinary printing paper with the printer's standard settings under the same conditions. During these test printing jobs, the printer was monitored for sensor errors. This test was repeated a total of 20 times, with a new ink encasement and a new sensor unit each time.

False detections were graded according to the criteria below. The results are presented in Tables 1 to 3. Grade A or B indicates beneficial effects.

A: No false detection

B: One false detection

C: Two false detections

D: Three or more false detections 3.2.2. Ejection Stability

After the end of the initial loading operation, an A4 solid pattern was continuously printed on ordinary printing paper with the printer's standard settings. After printing on 50 sheets, a nozzle check pattern was printed, and the printed pattern was observed for defective nozzles. This set of printing a solid pattern on 50 sheets and printing a nozzle check pattern was repeated a total of 20 times, and the number of defective nozzles in the nozzle check pattern was totaled up.

Ejection stability was graded according to the criteria below. The results are presented in Tables 1 to 3.

A: No defective nozzle

B: One or two defective nozzles

C: Three or more defective nozzles 3.2.3. Moisture Resistance

A pattern of 3-cm squares with a grid of 0.2-mm wide white lines therein (approximately 20 vertical and approximately 20 horizontal white lines) was printed on Epson photo paper. The printed copy was left under the conditions of a temperature of 40° C. and a relative humidity of 85% for 1 week and then inspected visually and microscopically for bleeding of the ink composition into the white lines.

Moisture resistance was graded according to the criteria below. The results are presented in Tables 1 to 3.

A: No bleed

B: Visual inspection finds no bleed, but microscopic observation finds bleeds.

C: Visual inspection finds bleeds.

3.3. Test Results

The Examples were ink jet recording apparatuses that included an ink composition, an ink encasement in which the ink composition was encased, a recording head that was to eject the ink composition, and a carriage configured to move the recording head back and forth. The ink composition contained a surfactant with an HLB of 6 or less. The carriage carried the ink encasement, with the ink encasement integrated with the carriage. The ink encasement had an ink fill port that opens and shuts as a port through which the ink composition was to be loaded and also had a detector that was to detect the amount of ink composition encased. As shown in Tables 1 to 3, in the Examples, false detections of the ink composition level were dramatically reduced.

The present disclosure is not limited to the above embodiments, and many variations are possible. For example, the present disclosure embraces configurations substantially identical to those described in the embodiments (e.g., configurations identical in function, methodology, and results to or having the same goal and offering the same advantages as the described ones). The present disclosure also includes configurations created by changing any nonessential part of those described in the above embodiments. Furthermore, the present disclosure encompasses configurations identical in operation and effect to or capable of fulfilling the same purposes as those described in the above embodiments. Configurations obtained by adding any known technology to those described in the embodiments are also part of the present disclosure.

What is claimed is:

1. An ink jet recording apparatus comprising:
   an ink composition;
   an ink encasement in which the ink composition is encased;
   a recording head that ejects the ink composition; and
   a carriage configured to move the recording head back and forth, wherein:
   the carriage carries the ink encasement, with the ink encasement integrated with the carriage;
   the ink encasement has an ink fill port that opens and shuts as a port through which the ink composition is loaded and also has a detector that detects an amount of the ink composition encased;
   the detector is a prism including a first surface, a second surface, and a third surface, the first and second surfaces being configured to reflect light incident thereon and the third surface being configured to transmit light to either the first or second surface and receive light reflected by either the first or second surface, the third surface being located exterior to the encasement; and
   the ink composition contains a surfactant with an HLB of 6 or less.

2. The ink jet recording apparatus according to claim 1, wherein
   the surfactant with an HLB of 6 or less contained in the ink composition is an acetylene glycol surfactant.

3. The ink jet recording apparatus according to claim 1, wherein
   the detector provides optical detection of the amount of the ink composition encased.

4. The ink jet recording apparatus according to claim 3, wherein:
   at least part of a surface of the prism is water-repellent.

5. The ink jet recording apparatus according to claim 4, wherein
   the prism has a siloxane compound on at least part of the surface thereof.

6. The ink jet recording apparatus according to claim 1, wherein
   the ink composition further contains a polyoxyalkylene alkyl ether surfactant.

7. The ink jet recording apparatus according to claim 6, wherein
   a ratio of an amount of the polyoxyalkylene alkyl ether surfactant to an amount of the surfactant with an HLB of 6 or less in the ink composition is 1.0 or more and 6.0 or less.

8. The ink jet recording apparatus according to claim 1, wherein
   the ink composition further contains an amphoteric surfactant.

9. An ink jet recording method in which an ink jet recording apparatus is used that includes:
   an ink composition;
   an ink encasement in which the ink composition is encased;
   a recording head that ejects the ink composition; and
   a carriage configured to move the recording head back and forth,
   the carriage carrying the ink encasement, with the ink encasement integrated with the carriage,
   the ink encasement having an ink fill port that opens and shuts as a port through which the ink composition is loaded and also having a detector that detects an amount of the ink composition encased,
   the detector is a prism including a first surface, a second surface, and a third surface, the first and second surfaces being configured to reflect light incident thereon and the third surface being configured to transmit light to either the first or second surface and receive light reflected by either the first or second surface, the third surface being located exterior to the encasement; and
   the ink composition containing a surfactant with an HLB of 6 or less,
   the method comprising ejecting the ink composition from the recording head to attach the ink composition to a recording medium.

10. An ink composition comprising a surfactant with an HLB of 6 or less,
    the ink composition being for use with an ink jet recording apparatus that includes:
    the ink composition;
    an ink encasement in which the ink composition is encased;
    a recording head that ejects the ink composition; and
    a carriage configured to move the recording head back and forth,
    the carriage carrying the ink encasement, with the ink encasement integrated with the carriage,
    the ink encasement having an ink fill port that opens and shuts as a port through which the ink composition is loaded and also having a detector that detects an amount of the ink composition encased, and
    the detector is a prism including a first surface, a second surface, and a third surface, the first and second surfaces being configured to reflect light incident thereon and the third surface being configured to transmit light to either the first or second surface and receive light reflected by either the first or second surface, the third surface being located exterior to the encasement.

* * * * *